US006476155B1

(12) United States Patent
Wada et al.

(10) Patent No.: US 6,476,155 B1
(45) Date of Patent: Nov. 5, 2002

(54) METHOD OF PRODUCING A HYDROPHILIC RESIN

(75) Inventors: Katsuyuki Wada, Himeji; Masatoshi Nakamura, Himeji; Kinya Nagasuna, Himeji; Yoshihiko Masuda, Takarazuka, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 253 days.

(21) Appl. No.: 09/634,532

(22) Filed: Aug. 8, 2000

Related U.S. Application Data

(62) Division of application No. 08/930,272, filed as application No. PCT/JP97/00229 on Jan. 31, 1997, now Pat. No. 6,150,469.

(30) Foreign Application Priority Data

Feb. 2, 1996 (JP) ............................................. 8-17894
Feb. 13, 1996 (JP) ............................................. 8-25552

(51) Int. Cl.$^7$ ................................................. L05F 8/32
(52) U.S. Cl. ................. 525/379; 525/329.7; 525/330.3; 525/382; 525/383; 525/384; 525/386
(58) Field of Search .................... 525/329.7, 330.3, 525/383, 384, 386, 379, 382

(56) References Cited

U.S. PATENT DOCUMENTS

| | | | |
|---|---|---|---|
| 3,853,828 A | 12/1974 | Wall et al. | 260/87.5 |
| 3,961,629 A | 6/1976 | Richter et al. | 128/296 |
| 4,281,668 A | 8/1981 | Richter et al. | 128/784 |
| 4,587,308 A | 5/1986 | Makita et al. | 525/373 |
| 4,666,983 A | 5/1987 | Tsubakimoto et al. | 525/119 |
| 4,727,097 A | 2/1988 | Kobayashi et al. | 523/408 |
| 4,824,916 A | 4/1989 | Kershner et al. | 525/420 |
| 5,002,986 A | 3/1991 | Fujiura et al. | 524/47 |
| 5,582,786 A | 12/1996 | Brunskill et al. | 264/103 |
| 5,597,873 A | 1/1997 | Chambers et al. | 525/330.1 |
| 5,728,792 A | 3/1998 | Tanaka et al. | 526/307.6 |
| 5,744,564 A | 4/1998 | Stanley, Jr. et al. | 526/317.1 |
| 5,789,507 A | 8/1998 | Tanaka et al. | 526/222 |
| 5,801,238 A | 9/1998 | Tanaka et al. | 536/123.1 |
| 5,886,120 A | 3/1999 | Tanaka et al. | 526/307 |

FOREIGN PATENT DOCUMENTS

GB        1482217        8/1977
JP        6-313044 A     11/1994

*Primary Examiner*—Bernard Lipman
(74) *Attorney, Agent, or Firm*—Kubovcik & Kubovcik

(57) ABSTRACT

A hydrophilic polymer is denatured with a gaseous denaturant or a powdery denaturant substance made from a liquid denaturant substance. The liquid denaturant substance is made into powders by, for example, a method of mixing the liquid denaturant substance with a water-insoluble compound, a method of cooling the liquid denaturant substance to or below its melting point to turn the same into a solid state. Consequently, the hydrophilic polymer can be denatured uniformly. In case that the hydrophilic polymer is denatured with a gaseous denaturant, the hydrophilic polymer and denaturant react with each other efficiently in a safe manner regardless of the size or shape of the hydrophilic polymer. In case that the hydrophilic polymer is denatured with the powdery denaturant substance, not only the liquid denaturant substance which is substantially in the solid state can be mixed with the hydrophilic polymer, but also the denaturation timing can be readily controlled.

8 Claims, 13 Drawing Sheets

POLYMER

METHOD OF PRODUCING A HYDROPHILIC RESIN

This application is a division of application Ser. No. 08/930,272, filed Sep. 29, 1997, now U.S. Pat. No. 6,150,459 which is a 371 of PCT/JP97/00229 filed Jan. 31, 1997.

TECHNICAL FIELD

The present invention relates to a denaturing method of a hydrophilic polymer and a producing method of a hydrophilic resin, and more particularly, to a producing method of a hydrophilic resin having excellent physical properties, such as an absorbing property, by uniformly denaturing a hydrophilic polymer, for example, by applying a crosslinking treatment to an absorbent resin.

TECHNICAL BACKGROUND

Recently, an absorbent resin is used extensively in sanitary goods, such as paper diapers, sanitary napkins, and incontinence pads, to absorb body fluids. Besides the sanitary goods, the absorbent resin is also used extensively in water-retaining materials for soil to keep water in soil or drip absorbing materials to absorb drip from foods or the like.

Examples of such absorbent resins include: a partially neutralized crosslinked polymer of polyacrylic acid, a hydrolyzed graft polymer of starch-acrylonitrile, a neutralized graft polymer of starch-acrylic acid, a saponified copolymer of vinyl acetate-acrylic ester, a hydrolyzed copolymer of acrylonitrile or acrylamide, or a crosslinked product thereof, and a crosslinked polymer of a cationic monomer.

Notable properties of the absorbent resin include absorbency and absorbing rate when brought into contact with an aqueous liquid like a body fluid, liquid permeability, gel strength of swelled gel, and absorbing power of absorbing water from a base material containing an aqueous liquid, etc. However, each property is not necessarily correlated positively to one another. For example, the higher the absorbency, the lower the absorbing rate, liquid permeability, and gel strength. To solve the above problem, a crosslinking treatment (secondary crosslinking treatment) using a crosslinking agent (denaturant) is conventionally applied to the absorbent resin to well balance (improve) these properties and enhance the absorbing property.

A secondary crosslinking structure is introduced into the absorbent resin in the following manner: a swelling liquid in which the absorbent resin is swelled with a solvent, or a dispersing liquid in which the absorbent resin is dispersed in a dispersing medium is prepared, and a crosslinking agent or a solution thereof is added to the above prepared liquid and mixed with each other, so that the reaction of the absorbent resin and crosslinking agent takes place in a so-called solid-liquid system. The solvent or dispersing medium referred to herein is, for example, a hydrophilic compound, such as water and alcohol.

Examples of the above method of introducing the secondary crosslinking structure into the absorbent resin using a crosslinking agent include: a method of using polyhydric alcohol (Japanese Laid-open Patent Application No. 180233/1983 (Tokukaisho No. 58-180233) and Japanese Laid-open Patent Application No. 16903/1986 (Tokukaisho No. 61-16903)), a method of using a polyglycidyl compound, a polyaziridine compound, a polyamine, or polyisocyanate (Japanese Laid-open Patent Application No. 189103/1984 (Tokukaisho No. 59-189103)), a method of using glyoxal (Japanese Laid-open Patent Application No. 117393/1977 (Tokukaisho No. 52-117393)), a method of using polyvalent metal compound (Japanese Laid-open Patent Application No. 136588/1976 (Tokukaisho No. 51-136588), Japanese Laid-open Patent Application No. 257235/1986 (Tokukaisho No. 61-257235), and Japanese Laid-open Patent Application No. 7745/1987 (Tokukaisho No. 62-7745)), a method of using a silane coupling agent (Japanese Laid-open Patent Application No. 211305/1986 (Tokukaisho No. 61-211305), Japanese Laid-open Patent Application No. 252212/1986 (Tokukaisho No. 61-252212), and Japanese Laid-open Patent Application No. 264006/1986 (Tokukaisho No. 61-264006)), a method of using an epoxy compound and a hydroxy compound (Japanese Laid-open Patent Application No. 132103/1990 (Tokukaihei No. 2-132103)), a method of using alkylene carbonate (German Patent No. 4,020,780), etc.

Also, a variety of methods are proposed to distribute the crosslinking agent over the surface of the absorbent resin more evenly to crosslink near the surface of the absorbent resin uniformly. Examples of such methods are: a method of adding the crosslinking agent to the absorbent resin in the presence of inactive inorganic powders (Japanese Laid-open Patent Application No. 163956/1985 (Tokukaisho No. 60-163956) and (Japanese Laid-open Patent Application No. 255814/1985 (Tokukaisho No. 60-255814)), a method of adding the crosslinking agent to the absorbent resin in the presence of dihydric alcohol (Japanese Laid-open Patent Application No. 292004/1989 (Tokukaihei No. 1-292004)), a method of adding the crosslinking agent to the absorbent resin in the presence of an ether compound (Japanese Laid-open Patent Application No. 153903/1990 (Tokukaihei No. 2-153903)), a method of adding the crosslinking agent to the absorbent resin in the presence of an alkylene oxide adduct of monohydric alcohol, an organic acid salt, or lactam (European Patent No. 555,692), etc.

However, the above conventional methods have the following problems. That is, because the conventional methods use the solvent or dispersing medium to react the absorbent resin with the crosslinking agent, these methods must include a post-treatment process, such as a removing step for removing the solvent or dispersing medium and a drying step. This is the reason why the entire procedure of introducing the secondary crosslinking structure into the absorbent resin is complicated. In addition, the crosslinking agent and the solvent or dispersing medium may reside in the post-reaction absorbent resin, thereby possibly making the resulting absorbent resin unsafe. Further, it is quite difficult to remove or collect an excessive crosslinking agent when the reaction ends.

Moreover, when microscopic powders of the absorbent resin are used, for example, a mixture of the absorbent resin and the solvent or dispersing medium produces an agglomerate, thereby making it impossible to swell or disperse the absorbent resin uniformly in a satisfactory manner. Thus, the secondary crosslinking structure can not be introduced into all kinds of absorbent resin uniformly because of their shape or size. In addition, the swelling liquid or dispersing liquid must be stirred relatively hard to let the absorbent resin swell or disperse the same uniformly in a satisfactory manner. Thus, the absorbent resin is susceptible to a physical damage, and. for example, the surface of the absorbent resin is often damaged when the reaction ends. Note that the agglomerate referred to herein means masses of agglomerated particles.

Also, to carry out the crosslinking treatment at a relatively high degree, for example, to attain high crosslinking density and depth, a relatively large amount of solvent or dispersing medium must be used, which makes the reaction of the absorbent resin and crosslinking agent inefficient. In addition, when a relatively large quantity of the solvent or dispersing medium is used, not only the agglomerate is readily produced, but also the energy cost of the post-treatment process increases undesirably.

Further, the conventional methods can change (improve) the balance of the notable properties of the absorbent resin to a certain extent, but not beyond the extent of practical use. For example, the recent sanitary goods tend to use more amount of absorbent resin while reducing its thickness. However, if the desired properties for the absorbent resin used in the materials of the sanitary goods, that is, an absorbent material, the conventional methods can not balance the properties in a practical manner. Therefore, there has been an increasing need for a method of balancing the properties in a practical manner, in other words, a method of further improving the quality of the absorbent resin.

More specifically, in case of an absorbent material containing a large amount of absorbent resin, namely, having a high concentration of absorbent resin, the desired properties are the absorbing property under pressure, such as absorbency and water retaining ability under pressure, bonding and shape-keeping properties when water is absorbed into spaces among the particles of the absorbent resin which are disclosed in Japanese Laid-open Patent Application No. 96159/1993 (Tokukaihei No. 5-96159), and bonding and shape-keeping properties of an absorbent material made of the absorbent resin, cellulose fiber, etc. when the absorbent material has absorbed water. However, the conventional methods are not effective enough to further improve the absorbing property under pressure. In addition, when the method disclosed in above Japanese Laid-open Patent Application No. 96159/1993 (Tokukaihei No. 5-96159) is adopted, although it becomes possible to control the inconveniences, for example, the absorbent resin is released from the absorbent material or migrates within the absorbent material while water is being absorbed, the absorbency under pressure can be hardly improved in some kinds of absorbent resin. Further, once the absorbent resin is produced, its bonding property deteriorates over time before the absorbent resin is actually used.

Therefore, the conventional methods cause a number of problems specified as above in a reaction of the absorbent resin and crosslinking agent, namely, in a reaction of a hydrophilic polymer and a denaturant.

DISCLOSURE OF THE INVENTION

The present invention is devised to solve the above problems, and therefore, has an object to provide a new denaturing method of a hydrophilic polymer which does not cause the above specified problems. The present invention has another object to provide a new producing method of a hydrophilic resin which does not cause the above specified problems.

The present invention has a further object to provide a producing method of a hydrophilic resin which has an excellent absorbing property under pressure, such as absorbency and water retaining ability under pressure, and can show excellent performance (absorbing property) even when used in the sanitary goods or the like having a high percent by weight of a hydrophilic polymer (high resin concentration).

The present invention has still another object to provide a producing method of a hydrophilic resin which has an excellent absorbing property under pressure, and when used in an absorbent material, a hydrophilic polymer contained therein is hardly released from the absorbent material while water is being absorbed; moreover, the hydrophilic resin maintains its bonding property over time after the production until being put into practical use.

The inventors of the present invention concentrated on the study to achieve the above objects, and discovered that the hydrophilic polymer can be readily and uniformly denatured without causing any of the above problems by being denatured with a denaturant turned into a gaseous state. The inventors of the present invention also discovered that the hydrophilic resin can be readily produced in a simple manner by reacting the hydrophilic polymer with the gaseous denaturant. Further, the inventors of the present invention discovered that the hydrophilic resin can be readily produced in a simple manner by denaturing the hydrophilic polymer with a powdery denaturant substance made from a liquid denaturant substance.

In short, the denaturing method of the hydrophilic polymer of the present invention is characterized in that the hydrophilic polymer is denatured with a gaseous denaturant to fulfil the above objects.

According to a first denaturing method, since the hydrophilic polymer is denatured with a gaseous denaturant, the hydrophilic polymer can be readily, uniformly denatured in a simple manner compared with a case where the hydrophilic polymer and denaturant are reacted with each other in a so-called solid-liquid system. In addition, the solvent or dispersing medium which are indispensable in the conventional methods can be omitted. Since the post-treatment process, such as the solvent or dispersing medium removing step and drying step, can be omitted, the entire denaturation procedure can be simplified and less expensive compared with the conventional methods. Further, since the denaturant and solvent or dispersing medium do not remain in the denatured hydrophilic polymer, the resulting hydrophilic polymer is quite safe. Furthermore, since the hydrophilic polymer is denatured with a gaseous denaturant, not only the hydrophilic polymer and denaturant can react with each other efficiently, but also an excessive denaturant can be readily removed and collected in a simple manner when the denaturation ends. Moreover, the collected denaturant can be readily recycled.

Using a gaseous denaturant can also make it possible to denature the hydrophilic polymer uniformly regardless of its shape and size. Thus, the hydrophilic polymer of a shape which can not be treated by the conventional methods, such as a sheet, film, plate, or block of hydrophilic polymer, or even a porous hydrophilic polymer can be denatured in the present invention. For example, microscopic powders of the hydrophilic polymer can be denatured in the present invention. In short, the denaturing method of the present invention is applicable to any hydrophilic polymer regardless of its shape and size. Further, the hydrophilic polymer is protected from physical damages. For example, the surface of the denatured hydrophilic polymer is not damaged at all.

In case that a crosslinking agent is used as the denaturant, the crosslinking treatment can be also applied to the hydrophilic polymer. In case that the hydrophilic polymer is an absorbent resin, the properties, such as an absorbing property, of the denatured hydrophilic polymer can be improved, To solve the above problems, the producing method of the hydrophilic resin of the present invention is characterized in that the hydrophilic polymer and a gaseous denaturant are reacted with each other.

According to the above arrangement, since the hydrophilic polymer and a gaseous denaturant are reacted with each other, the solvent or dispersing medium which is indispensable in the conventional methods can be omitted. Thus, since the post-treatment process, such as the removing step or drying step, can be omitted, the procedure of the above reaction can be simplified and less expensive compared with the conventional methods. Also, because the denaturant and solvent or dispersing medium do not remain in the resulting hydrophilic resin obtained as a reaction product, the resulting hydrophilic resin is quite safe. Furthermore, since the hydrophilic polymer is denatured with the gaseous denaturant, not only the hydrophilic polymer and denaturant can react with each other efficiently, but also an excessive denaturant can be readily removed and collected in a simple manner when the reaction ends. Moreover, the collected denaturant can be readily recycled. Consequently, it has become possible to produce the hydrophilic resin readily in a simple manner.

To solve the above problems, another producing method of the hydrophilic resin of the present invention is characterized in that the hydrophilic polymer is mixed with a powdery denaturant substance made from a liquid denaturant substance, for example, by mixing the liquid denaturant substance with a water-insoluble compound, cooling the liquid denaturant substance to or below the melting point, or the like.

In the conventional methods, to denature the hydrophilic polymer, more specifically, to apply a surface crosslinking treatment to an absorbent resin using a crosslinking agent, for example, the absorbent resin is mixed with a the crosslinking agent alone or an aqueous solution of the same. Generally, the crosslinking agent is in a liquid state at room temperature and has high affinity with the absorbent resin. For this reason, the absorbent resin starts to absorb the crosslinking agent, or the reaction of the absorbent resin and crosslinking agent takes place as soon as the absorbent resin and crosslinking agent are mixed with each other. Thus, the crosslinking agent can not be distributed evenly on the surface of the absorbent resin, and hence, the surface crosslinking treatment can not be applied uniformly to the absorbent resin.

In contrast, according to the producing method of the hydrophilic resin of the present invention, a liquid denaturant substance is made into powders first, and thence mixed with the hydrophilic polymer. Thus, the hydrophilic polymer can be mixed with the liquid denaturant substance which is substantially turned into a solid state. Consequently, compared with a case where the hydrophilic polymer is mixed with the liquid denaturant substance directly, the hydrophilic polymer can be mixed homogeneously with the liquid denaturant substance which has been made into powders in effect. Also, according to the producing method of the hydrophilic resin of the present invention, the liquid denaturant substance is made into powders. Thus, when the hydrophilic polymer and powdery denaturant substance are mixed with each other, the hydrophilic polymer does not start to absorb the liquid denaturant substance contained in the powdery denaturant substance, nor does the reaction of the hydrophilic polymer and the denaturant contained in the liquid denaturant substance take place immediately. The hydrophilic polymer is denatured when a mixture of the hydrophilic polymer and powdery denaturant substance has absorbed an aqueous liquid or when the mixture is heated. Therefore, according to the producing method of the hydrophilic resin of the present invention, since the hydrophilic polymer and powdery denaturant substance can be mixed with each other homogeneously, not only the hydrophilic polymer can be denatured uniformly, but also the denaturation timing can be controlled.

Thus, according to the above method, not only the hydrophilic polymer can be denatured uniformly, but also the hydrophilic resin with a good balance of the properties can be obtained.

In the following, the present invention will be described in detail.

In the present invention, a gaseous denaturant or a powdery denaturant substance made from a liquid denaturant substance are used to denature the hydrophilic polymer uniformly. Note that, in the present invention, "denaturation" means to change the structure or physical properties of the hydrophilic polymer by bringing the hydrophilic polymer into contact with the denaturant or reacting the hydrophilic polymer with the denaturant. To be more specific, "denaturation" means, for example, a crosslinking treatment (secondary crosslinking treatment). The reaction of the hydrophilic polymer and denaturant includes a crosslinking reaction, an addition reaction, a substitute reaction, an esterification reaction, etc.

The hydrophilic polymer subject to denaturation (hereinafter, referred to as treatment) by the denaturing method and producing method of the present invention is not especially limited, and a solid or gel of any hydrophilic polymer having a reaction group (functional group) is applicable. A carboxyl group is particularly preferred as the above reaction group. Also, the hydrophilic polymer having a crosslinking structure inside is preferred. More specifically, a good example of the hydrophilic polymer is partially neutralized poly(meth)acrylic acid having the crosslinking structure inside, such as an absorbent resin.

The hydrophilic polymer can be obtained by, for example, polymerizing a monomeric composition mainly composed of acrylic acid and a salt thereof (hereinafter, referred to as acrylic acid/salt). Examples of the hydrophilic polymer are known absorbent resins including: a partially neutralized crosslinked polymer of polyacrylic acid (U.S. Pat. Nos. 4,625,001, 4,654,039, 5,250,640, and 5,275,773, and European Patent No. 456,136), a hydrolyzed graft polymer of starch-acrylonitrile, a neutralized or partially neutralized crosslinked graft polymer of starch-acrylic acid (U.S. Pat. No. 4,076,663), a saponified copolymer of vinyl acetate-acrylic acid (U.S. Pat. No. 4,124,748), a saponified copolymer of vinyl acetate-acrylic ester, a hydrolyzed (co)polymer of acrylonitrile (U.S. Pat. No. 3,935,099) or a crosslinked product thereof, a hydrolyzed copolymer of acrylamide (U.S. Pat. No. 3,959,569) or a crosslinked product thereof, a crosslinked carboxymethyl cellulose, a crosslinked cationic monomer, a crosslinked copolymer of isobutylene-maleic anhydride, a crosslinked copolymer of 2-acrylamide-2-methylpropane sulfonic acid and acrylic acid, a crosslinked polyethylene oxide, a crosslinked copolymer of methoxypolyethylene glycol and acrylic acid, etc. Of all the above example hydrophilic polymers, crosslinked polyacrylic acid/salt is preferred. It is preferable that 50 mol%–90 mol% of acidic groups in the crosslinked polyacrylic acid/salt are neutralized. Also, alkali metal salt, alkali earth metal salt, ammonium salt, hydroxyammonium salt, amine salt, alkylamine salt, etc. are preferred as the salt.

Besides acrylic acid/salt, the monomeric composition may optionally contain a hydrophilic monomer copolymerizable with acrylic acid/salt. Examples of the hydrophilic monomer include:

anionic unsaturated monomers, such as methacrylic acid, crotonic acid, maleic acid, maleic anhydride, fumaric acid, itaconic acid, cinnamic acid, sorbic acid, β-acryloyloxypropionic acid, 2-(meth)acryloylethane sulfonic acid, 2-(meta)acryloylpropane sulfonic acid, 2-(meth) acrylamide-2-methylpropane sulfonic acid, vinyl sulfonic acid, styrene sulfonic acid, allyl sulfonic acid, vinyl phosponic acid, and 2-(meth)acryloyloxyethyl phosphoric acid, or salts of these acids (for example, alkali metal salt, alkali earth metal salt, ammonium salt, and alkylamine salt);

nonionic unsaturated monomers, such as acrylamide, methacrylamide, N-ethyl(meth)acrylamide, N-n-propyl (meth)acrylamide, N-isopropyl(meth)acrylamide, N,N-dimethyl(meth)acrylamide, 2-hydroxyethyl(meth)acrylate, 2-hydroxypropyl(meth)acrylate, methoxypolyethylene glycol (meth)acrylate, polyethylene glycol mono(meth) acrylate, vinylpyridine, N-vinylpyrrolidone, N-acryloylpiperidine, and N-acryloylpyrrolidine;

cationic unsaturated monomers, such as N,N-dimethylaminoethyl(meth)acrylate, N,N-diethylaminoethyl (meth)acrylate, N,N-dimethylaminopropyl(meth)acrylate, and N,N-dimethylaminopropyl(meth)acrylamide, or quaternary compounds thereof (for example, a reaction product with alkyl halide, or a reaction product with dialkyl sulfric acid); etc.

One member or a mixture of more than one member selected from these example hydrophilic monomers can be used effectively.

In case that the monomeric composition is mainly composed of acrylic acid/salt, an amount of the hydrophilic monomers other than acrylic acid/salt is preferably below 50 mol%, more preferably 30 mol% or below, and most preferably 10 mol% or below based on the combined weight of the monomeric compositions.

It is preferable that the hydrophilic polymer produced by (co)polymerizing the above monomeric composition(s) has (have) the crosslinking structure (primary crosslinking structure) inside. The above crosslinking structure can be readily introduced into the hydrophilic polymer using an internal crosslinking agent when the monomeric composition is copolymerized, so that the monomeric composition copolymerizes or reacts with the internal crosslinking agent. The hydrophilic polymer may be of a self-crosslinking type that does not need the internal crosslinking agent.

Examples of the internal crosslinking agent include: a compound having a plurality of vinyl groups (polymeric unsaturated groups) within a molecule; a compound having at least one vinyl group and at least one functional group reactive with a reaction group contained in the monomeric composition within a molecule; a compound having a plurality of functional groups reactive with the above reaction group within a molecule; etc. One member or a mixture of more than one member selected from these example internal crosslinking agents can be used effectively.

Examples of the compound having a plurality of vinyl groups within a molecule include N,N'-methylenebis(meth) acrylamide, (poly)ethylene glycol di(meth)acrylate, (poly) propylene glycol di(meth)acrylate, trimethylolpropane tri (meth)acrylate, trimethylolpropane di(meth)acrylate, glycerin tri(meth)acrylate, glycerin acrylate methacrylate, ethyleneoxide denatured trimethylolpropane tri(meth) acrylate, pentaerythritol tetra(meth)acrylate, dipentaerythritol hexa(meth)acrylate, N,N-diallylacrylamide, triallyl cyanurate, triallyl isocyanurate, triallyl phosphate, triallyl amine, diallyloxy acetic acid, N-methyl-N-vinylacrylamide, bis (N-vinyl carboxylic amide), poly(meth)allyloxyalkanes, such as tetraallyloxy ethane, etc.

The compound having at least one vinyl group and at least one functional group reactive with the reaction group within a molecule means an ethylenic unsaturated compound having at least one of a hydroxyl group, an epoxy group, a cationic group and the like, and the examples of which include: glycidyl(meth)acrylate, N-methylol acrylamide, (meth)acrylic acid dimethylamino ethyl, etc.

The compound having a plurality of functional groups reactive with the reaction group within a molecule means, for example, a compound having at least two groups selected from a hydroxyl group, an epoxy group, a cationic group, an isocyanate group, etc. Examples of such a compound include: (poly)ethylene glycol diglycidyl ether, glycerol diglycidyl ether, ethylene glycol, polyethylene glycol, propylene glycol, glycerin, pentaerythritol, ethylene diamine, ethylene carbonate, polyethyleneimine, aluminum sulfate, etc.

Of all these example internal crosslinking agents, the compound having a plurality of vinyl groups within a molecule is preferred, because using such a compound can further improve the properties of the resulting hydrophilic polymer, for example, the absorbing property in case that the hydrophilic polymer is an absorbent resin. Although an amount of the internal crosslinking agent with respect to an amount of the hydrophilic monomer varies with a combination of the hydrophilic monomer and internal crosslinking agent, a preferable range is between 0.005 mol% and 3 mol%, and a more preferable range is between 0.01 mol% and 1.5 mol%. If less than 0.005 mol% or more than 3 mol% of the internal crosslinking agent is used when the hydrophilic polymer is the absorbent resin, for example, the resulting absorbent resin may not have the desired absorbing property.

When the monomeric composition is (co)polymerized, hydrophilic high polymers, such as starch or derivatives of starch, cellulose or derivatives of cellulose, polyvinylalcohol, polyacrylic acid/salt and a crosslinked product of the same, or chain transfer agents, such as hypophosphorous acid and hypophosphite, may be added to the reactant system.

The polymerization method for (co)polymerizing the monomeric composition is not especially limited, and known methods, such as the aqueous solution polymerization, reverse phase suspension polymerization, bulk polymerization, and precipitation polymerization, can be adopted. Of these polymerization methods, the methods in which an aqueous solution of the monomeric composition is polymerized, that is, the aqueous solution polymerization and reverse phase suspension polymerization are preferable because the polymerization reaction can be readily controlled and the properties of the resulting hydrophilic polymer can be further improved. The reaction conditions, such as reaction temperature and time, are not especially limited, and can be set arbitrarily depending on the kinds of the hydrophilic monomer or the like. The aqueous solution polymerization and reverse phase suspension polymerization can be carried out by known polymerization methods disclosed in, for example, U.S. Pat. Nos. 4,625,001, 4,769, 427, 4,873,299, 4,093,776, 4,367,323, 4,446,261, 4,683,274, 4,690,996, 4,721,647, 4,738,867, and 4,748,076.

When the monomeric composition is (co)polymerized, a radical polymerization initiator or activation energy rays, such as UV rays and electron beams, can be used. Examples of the radical polymerization initiator include peroxides, such as potassium persulfate, sodium persulfate, ammonium persulfate, t-butylhydro peroxide, hydrogen peroxide, 2,2'-azobis (2-amidinopropane) dihydrochloride, 2,2'-azobisisobutyronitrile benzoyl peroxide, cumene hydroperoxide, and di-t-butylperoxide. One member or a mixture of more than one member selected from these radical polymerization initiators can be used effectively. An oxidizing radical polymerization initiator may be used as a redox initiator when combined with a reducing agent, such as sulfites including sodium sulfite and sodium hydrogen sulfite, bisulfite, thiosulfate, formamidine sulfenic acid, ferrous sulfate, and L-ascorbic acid. An amount of the polymerization initiator with respect to an amount of the hydrophilic monomer varies with a combination of the hydrophilic monomer and polymerization initiator or the like, but a preferable range is between 0.001 mol% and 2 mol%, and a more preferable range is between 0.01 mol% and 0.5 mol%.

The shape of the hydrophilic polymer obtained as the result of the above (co)polymerization is not especially limited, and the hydrophilic polymer can be spherical, substantially spherical, granular, leaflet, flat, etc. particles; a fiber; a bar, a sheet, a film, a plate, a block, or have an undefined shape (pulverized undefinedly); etc. The hydrophilic polymer may be a porous product or a sponge having sequential pores therein. The size of the hydrophilic polymer is not especially limited either, and the hydrophilic polymer may be microscopic powders. In other words, the hydrophilic polymer does not have to be of specific shape and size when treated by the denaturant, and can be of any suitable shape and size for the intended use. In short, the denaturing method of the present invention is applicable to any hydrophilic polymer regardless of its shape and size.

The particle size of the hydrophilic polymer may be adjusted through sieving or the like when necessary. In case that the hydrophilic polymer is an absorbent resin, a preferable particle size is in a range between 200 $\mu$m and 600 $\mu$m. In this case, it is further preferable that the particles having a particle size of smaller than 150 $\mu$m are 10 wt% or less, and more preferably 5 wt% or less, based on the weight of the hydrophilic polymer. When an average particle size of the hydrophilic polymer is outside of the above range, it becomes difficult to obtain the hydrophilic polymer with an excellent absorbing property.

According to the denaturing method of the present invention, the hydrophilic polymer is denatured with, for example, a gaseous denaturant. In practice, the hydrophilic polymer is brought into contact with the gaseous denaturant to be denatured. According to the producing method of the present invention, the hydrophilic polymer and gaseous denaturant are reacted with each other to obtain the hydrophilic resin as a reaction product.

In this case, the denaturant only has to be in the gaseous state (vapor state) when brought into contact with the hydrophilic polymer. In other words, the denaturant used in the above denaturing and producing methods is not especially limited, and any compound that turns into a gas under gasfication conditions at or above the boiling point and reacts with a reaction group contained in the hydrophilic polymer in the gaseous state, that is, a compound reactive in the so-called solid-vapor system, is applicable. Alternatively, the denaturant may be a compound that turns into a gas under gasfication conditions at or above the boiling point, and turns into a liquid upon contact with the hydrophilic polymer while reacting with the functional group (reaction group) contained in the hydrophilic polymer in the liquid state. Further, the denaturant may be a compound that turns into a solid upon contact with the hydrophilic polymer and reacts with the functional group (reaction group) contained in the hydrophilic polymer in the solid state. In short, the denaturant only has to be in the gaseous state when brought into contact with the hydrophilic polymer, and the denaturant can be of any state (gas, liquid or solid) when reacting with the reaction group contained in the hydrophilic polymer.

A so-called crosslinking agent is preferable as the denaturant, and examples of which include:

alkylene oxide compounds, such as ethylene oxide (boiling point: 10.7° C./760 mmHg) and propylene oxide (boiling point: 34.2° C./760 mmHg);

alkyleneimine compounds, such as ethyleneimine (boiling point: 56° C./760 mmHg), propyleneimine (boiling point: 67° C./760 mmHg);

polyglycidyl ether compounds, such as ethylene glycol diglycidyl ether (boiling point: 125° C./5 mmHg), neopentyl glycol diglycidyl ether (boiling point: 125° C./1 mmHg), and glycerol triglycidyl ether (boiling point: 195° C./1.5 mmHg);

alkylene carbonate compounds, such as ethylene carbonate (boiling point: 100° C./5 mmHg) and propylene carbonate (boiling point: 242° C./760 mmHg);

polyhydric alcohol compounds, such as ethylene glycol (boiling point: 70° C./3 mmHg), diethylene glycol (boiling point: 244° C./760 mmHg), triethylene glycol (boiling point: 287° C./760 mmHg), and glycerin (boiling point: 290° C./760 mmHg);

polyamine compounds, such as ethylene diamine (boiling point: 116° C./760 mmHg), hexamethylene diamine (boiling point: 196° C./760 mmHg), diethylene triamine (boiling point: 207° C./760 mmHg), triethylene tetramine (boiling point: 287° C./760 mmHg), and tetramethyl ethylene diamine (boiling point: 120° C./760 mmHg);

haloepoxy compounds, such as epichlorohydrin (boiling point: 62° C./100 mmHg);

polyaldehyde compounds, such as glutaraldehyde (boiling point: 72° C./10 mmHg) and glyoxal (boiling point: 51° C./776 mmHg);

alkylene sulfide compounds, such as ethylene sulfide (boiling point: 53° C./760 mmHg) and propylene sulfide (boiling point: 70° C./760 mmHg); etc.

One member or a mixture of more than one member selected from these denaturants can be used effectively. Using a mixture of more than one denaturant can denature the hydrophilic polymer in several manners concurrently, namely, in a single step.

To turn the above example compounds into a gas, a vapor pressure is raised above the pressure inside the denaturation system (hereinafter, referred to as treatment system). More specifically, the denaturant is turned into a gas either by heating the treatment system inside at or above the boiling point of the denaturant being used, or reducing a pressure inside the treatment system below a vapor pressure of the denaturant being used, or a combination of both.

To be more specific, in case of ethylene oxide, as can be understood from Table 1 below showing a temperature-vapor pressure relation, under the pressuring condition at about 5 Kgf/cm$^2$, for example, ethylene oxide is tuned into a gas at or above 50° C. In this manner, the gasfication conditions can be changed arbitrary for the compound being used as the denaturant, and as a consequence, a so-called solid-vapor reaction can be realized.

TABLE 1

| TEMPERATURE (° C.) | VAPOR PRESSURE (mmHg) | TEMPERATURE (° C.) | VAPOR PRESSURE (mmHg) |
|---|---|---|---|
| −57.0 | 19.5 | 11.6 | 786.5 |
| −50.3 | 32.7 | 12.8 | 824.9 |
| −43.4 | 50.9 | 30.0 | 1560 |
| −37.4 | 74.5 | 45.0 | 2542 |
| −30.4 | 110.6 | 50.0 | 2967 |
| −24.2 | 155.7 | 59.9 | 3946 |
| −18.9 | 207.5 | 69.8 | 5141 |
| −14.6 | 257.6 | 79.6 | 6600 |
| −10.5 | 312.7 | 89.5 | 8319 |
| −7.8 | 352.8 | 97.9 | 10030 |
| −5.8 | 388.2 | 109.8 | 12720 |
| −3.3 | 431.7 | 119.6 | 15500 |
| 0.0 | 493.1 | 129.5 | 18690 |
| 2.0 | 537.0 | 139.3 | 22320 |
| 5.3 | 615.8 | 149.7 | 26730 |
| 7.9 | 682.2 | 159.7 | 31450 |
| 9.4 | 722.7 | 169.5 | 36780 |
| 10.6 | 756.6 | 179.3 | 42750 |
| 11.0 | 768.0 | 189.1 | 49840 |

The treatment conditions under which the hydrophilic polymer is treated with a gaseous denaturant are not especially limited as long as the denaturant remains in the gaseous state. For example, the treatment is carried out under a reduced, normal (ambient), or applying pressure. To treat the hydrophilic polymer at a high degree, that is, to obtain relatively high crosslinking density or crosslinking depth, there may be a case that the treatment under a normal pressure is more preferable than the treatment under a reduced pressure, and also there may be a case that the treatment under an applying pressure is more preferable than the treatment under a normal pressure. In short, the treatment pressure can be set arbitrarily depending on the desired treatment degree. Manipulating the treatment pressure makes it possible to readily control the treatment degree of the hydrophilic polymer.

Although a treatment temperature varies with the treatment pressure or the reactivity of the hydrophilic polymer and denaturant, the treatment temperature is preferably in a range between room temperature and 300° C., more preferably in a range between 100° C. and 250° C., and most preferably in a range between 130° C. and 230° C. A treatment time is not especially limited and can be set arbitrarily in response to the treatment temperature and pressure, or reactivity of the hydrophilic polymer and denaturant. The treatment time is preferably in a range between a few seconds and 2 hours, and more preferably in a range between a few minutes and 1 hour. Note that the reaction of the hydrophilic polymer and denaturant can take place in a reactant system with no water, that is, an anhydrous state. In other words, the denaturing method of the present invention is not affected whether there is water in the treatment system or not.

A treatment apparatus is not especially limited and only has to include an arrangement such that the hydrophilic polymer (hereinafter, simply referred to as polymer) can be brought into contact with a gaseous denaturant (hereinafter, sometimes simply referred to as gas in a satisfactory manner, that is, an arrangement such that the solid-vapor system reaction can be realized. Known reacting apparatuses can be used as the treatment apparatus. For example, ① a moving bed type reacting apparatus for moving the polymer gradually to trigger the reaction with the gas upon contact; ② a fluidized bed type reacting apparatus for keeping the polymer afloat and suspended in the gas to trigger the reaction upon contact; ③ a fixed bed type reacting apparatus for keeping the polymer as a fixed bed while moving the gas in a single phase current, counter current, or parallel current to trigger the reaction upon contact; ④ stirring bath type reacting apparatus for stirring the polymer and gas in the bath using a stirring blade to trigger the reaction upon contact; ⑤ a flash type reacting apparatus for blowing out the polymer with a gas flow to trigger the reaction upon contact; etc.

Examples of the moving bed type reacting apparatus are illustrated in FIGS. 1 through 7. More specifically, examples include: a counter-current stand type reacting apparatus of FIGS. 1 or 2, in which the polymer moves downwards while the gas moves upwards; a cross type reacting apparatus of FIG. 3, in which the polymer moves downward while the gas moves transversely; migration grate type reacting apparatus of FIGS. 4 or 5, in which the polymer is conveyed horizontally by a belt conveyor while the gas moves upwards; a rotary kiln type reacting apparatus of FIG. 6, in which the polymer and gas are moved in the same direction as the apparatus rotates; a multi-stage kiln type reacting apparatus of FIG. 7, in which a number of stages are made inside the apparatus, so that the polymer moves downward step by step while the gas moves upward; etc. Note that the migration grate type reacting apparatus of FIG. 5 is particularly suitable when a sheet of polymer is denatured.

Examples of the moving bed type reacting apparatus are illustrated in FIGS. 8 through 11. More specifically, examples include: a vapor-solid moving bed type reacting apparatus of FIGS. 8 or 9, in which the polymer is afloat or suspended in the apparatus furnished with inner members, such as a porous plate, a metal gauze, and a pipe, while the gas moves upwards; a high-speed moving bed type reacting apparatus of FIG. 10, in which the polymer is afloat or suspended by moving the gas upward at a high speed; a jet bed type reacting apparatus of FIG. 11, in which the polymer is afloat or suspended by an upward jet of the gas; etc.

Examples of the stirring bath type reacting apparatus are illustrated in FIGS. 12 and 13. More specifically, examples include: a vapor-solid stirring bath type reacting apparatus of FIG. 12, in which the polymer and gas in the bath are stirred by the stirring blade; and a multi-stage blade bath type reacting apparatus of FIG. 13, in which a number of partitions are provided in the bath, so that the polymer and gas are moving upward step by step while being stirred by the stirring blade; etc.

Also, an example of the flash type reacting apparatus is illustrated in FIG. 14, which is a vapor-solid flash type reacting apparatus for blowing out the polymer with the gas flow.

The structure of the treatment apparatus, that is, the reacting apparatus, is not limited to those of the above examples. The treatment apparatus can be either the batch type or continuous type. For example, a reacting apparatus of a sealed system, such as an autoclave, can be suitably used as the treatment apparatus. In short, the denaturing method of the present invention can be carried out satisfactorily by the treatment apparatus of either the batch type or continuous type. Also, the hydrophilic polymer can be treated uniformly by bringing the hydrophilic polymer into contact with a gaseous denaturant in a satisfactory manner by the treatment apparatus under predetermined conditions. As previously mentioned, since the denaturing method of the present invention uses a gas, the denaturation takes a relatively short time and completes in a reliable manner.

As has been explained, the denaturing method of the hydrophilic polymer of the present invention is the method of denaturing the hydrophilic polymer with a gaseous denaturant. The hydrophilic polymer and denaturant are, for example, an absorbent resin and a crosslinking agent, respectively.

According to the above method, the solvent or dispersing medium which is indispensable in the conventional methods can be omitted. Thus, the denaturation procedure can be simplified and less expensive compared with the conventional methods. Also, since the denaturant and solvent or dispersing medium do not remain in the denatured hydrophilic polymer, the denatured hydrophilic polymer is quite safe. Further, not only can the hydrophilic polymer and denaturant react with each other efficiently, but also an excessive denaturant can be readily removed and collected in a simple manner when the denaturation ends. Moreover, the collected denaturant can be readily recycled.

Additionally, according to the above method, the hydrophilic polymer can be denatured uniformly regardless of its size and shape. Thus, the hydrophilic polymer of some specific shapes, or porous hydrophilic polymer which cannot be treated by the conventional methods can be denatured by the above method. Further, for example, even microscopic powders of the hydrophilic polymer can be denatured by the above method. In short, the above method can be applied to any hydrophilic polymer regardless of its shape and size. Furthermore, a physical damage, such as the damage to the surface of the denatured hydrophilic polymer, can be prevented.

In case a crosslinking agent is used as the gaseous denaturant, the crosslinking treatment can be also applied to the hydrophilic polymer. Also, in case that the hydrophilic polymer is an absorbent resin, the properties, such as an absorbing property, can be improved.

As has been explained, the producing method of the hydrophilic resin of the present invention is a method of reacting the hydrophilic polymer with a gaseous denaturant. According to the above method, since the hydrophilic polymer and gaseous denaturant are reacted with each other, the solvent or dispersing medium which is indispensable in the conventional methods can be omitted. Thus, since the post-treatment procedure, such as the removing step or drying step, can be omitted, the reaction procedure can be simplified and less expensive compared with the conventional methods. Also, since the denaturant and solvent or dispersing medium do not remain in the hydrophilic resin obtained as a reaction product, the resulting hydrophilic resin is quite safe. Further, since the hydrophilic polymer is reacted with the gaseous denaturant, not only the reaction takes place efficiently, but also an excessive denaturant can be readily removed and collected in a simple manner when the reaction ends. Furthermore, the collected denaturant can be readily recycled. Consequently, it has become possible to produce the hydrophilic resin readily in a simple manner.

Also, another producing method of the hydrophilic resin of the present invention is a method of mixing the hydrophilic polymer with a powdery denaturant substance made from a liquid denaturant substance. In the present invention, the liquid denaturant substance means a denaturant substance that remains in the liquid state when being added to the hydrophilic polymer. The liquid denaturant substance can be a pure liquid of the denaturant or a solution or dispersing liquid prepared by dissolving or dispersing the denaturant into an adequate solvent. In other words, the liquid denaturant substance is not especially limited as long as it contains the denaturant and remains in the liquid state when being added to the hydrophilic polymer.

The denaturant is not especially limited either, and can be any compound reactive with a reaction group contained in the hydrophilic polymer. In this case, the denaturant is a compound having a number of functional groups reactive with a reaction group contained in the hydrophilic polymer within a molecule (that is, multifunctional compound), or a compound having a single functional group reactive with a reaction group contained in the hydrophilic polymer within a molecule (unifunctional compound).

An example of the compound having a number of functional groups reactive with a reaction group contained in the hydrophilic polymer within a molecule and serving as the denaturant is a crosslinking agent (surface crosslinking agent). In case that the reaction group contained in the hydrophilic polymer is a carboxyl group, examples of preferred crosslinking agent include, but are not limited to the known surface crosslinking agents as follow:

polyhydric alcohols, such as ethylene glycol, propylene glycol, diethylene glycol, dipropylene glycol, triethylene glycol, tripropylene glycol, tetraethylene glycol, tetrapropylene glycol, polyethylene glycol, polypropylene glycol, 1,3-propanediol, 2,2,4-trimethyl-1,3-pentanediol, glycerin, polyglycerin, 2-butene-1,4-diol, 1,3-butanediol, 1,4-butanediol, 1,5-pentanediol, 2,4-pentanediol, 1,6-hexanediol, 2,5-hexanediol, 1,2-cyclohexane dimethanol, 1,2-cyclohexanol, trimethylolpropane, diethanolamine, triethanolamine, polyoxypropylene, a block copolymer of oxyethylene-oxypropylene, pentaerythritol, and sorbitol;

polyepoxides, such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, and glycidol;

polyamines, such as ethylene diamine, diethylene triamine, triethylene tetramine, tetraethylene pentamine, pentaethylene hexamine, polyallylamine, and polyethyleneimine;

alkylene carbonates, such as 1,3-dioxolane-2-one, 4-methyl-1,3-dioxolane-2-one, 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, and 4,6-dimethyl-1,3-dioxane-2-one;

polyisocyanates, such as 2,4-tolylene diisocyanate and hexamethylene diisocyanate;

polyoxazoline compounds, such as 1,2-ethylenebis oxazoline;

haloepoxides, such as epichlorohydrin, epibromohydrin, α-methylepichlorohydrin;

polyvalent metal compounds, namely, a hydroxide and a chloride of polyvalent metals, such as zinc, calcium, magnesium, aluminum, iron, and zirconium; etc.

One member or a mixture of more than one member selected from these crosslinking agents can be used effectively.

Of all these examples, a crosslinking agent containing at least one kind of compound selected from a group consisting of polyhydric alcohol, polyepoxide, polyamine, and alkylene carbonate is preferred.

Of all the polyamines, a polyamine (hereinafter, referred to as high molecular weight polyamine) having a weight average molecular weight (Mw) of 2,000 or greater is preferable, and a high molecular weight polyamine having a weight average molecular weight ranging from 10,000 to 10,000,000 is particularly preferable. If a high molecular weight polyamine having a weight average molecular weight less than 2,000 is used, the resulting hydrophilic resin may not have satisfactory bonding property or shape-keeping property when water is being absorbed into spaces among particles of the hydrophilic polymer, or an absorbent material made of the hydrophilic resin and cellulose fiber (for example, paper and comminuted pulp) may not have satisfactory bonding property or shape-keeping property when water is being absorbed.

In case that the crosslinking agent includes the high molecular weight polyamine, the hydrophilic polymer and high molecular weight polyamine contact and start to react with each other when the hydrophilic resin, namely, the hydrophilic polymer contained in the hydrophilic resin, has absorbed an aqueous liquid, whereupon the bonding force among the particles of the hydrophilic polymer or shape-keeping ability of the absorbent product is developed. Therefore, according to the present invention, the reaction timing of the hydrophilic polymer and high molecular weight polyamine can be controlled, and the deterioration of the bonding property over time can be prevented more effectively. In case that the high molecular weight polyamine is used as the crosslinking agent, the surface crosslinking treatment may be applied to the surface portion of the hydrophilic polymer in advance by any known surface crosslinking method or the method of the present invention.

Examples of the high molecular weight polyamine include:

(1) a monopolymer of monoallylamine derivative and a monopolymer of a diallylamine derivative;
(2) a copolymer of more than one kind of monoallylamine derivatives, a copolymer of more than one kind of diallylamine derivatives, a copolymer of a monoallylamine derivative and a diallylamine derivative;
(3) a copolymer of a monoallylamine derivative and/or diallylamine derivative, and a dialkyldiallylammonium salt;
(4) a homopolymer of an unsaturated carboxylic acid derivative containing a tertiary amino group (hereinafter referred to as the unsaturated carboxylic acid derivative a);
(5) a copolymer of more than one kind of the unsaturated carboxylic acid derivatives a;
(6) a copolymer of the unsaturated carboxylic acid derivative a, and a protonic and/or alkylated tertiary amino group of the unsaturated carboxylic acid derivative a (hereinafter simply referred to as quaternary ammonium salt), and/or a dialkyldiallylammonium salt;
(7) a ternary copolymer of the unsaturated carboxylic acid derivatives a, quaternary ammonium salt and/or a dialkyldiallylammonium salt, and a vinyl monomer copolymerizable with the above monomers;
(8) a polymer produced by copolymerizing an unsaturated carboxylic acid and an unsaturated monomer copolymerizable with the unsaturated carboxylic acid first, and thence reacting alkyleneimine with a carboxyl group contained in the resulting copolymer;
(9) polyalkyleneimine;
(10) polyalkyleneimine-epihalohydrin resin;
(11) polyalkylenepolyamine;
(12) a polymer of (2-methacryloyloxyethyl) ethyleneimine, and a copolymer of (2-methacryloyloxyethyl)ethyleneimine and an unsaturated monomer copolymerizable with (2-methacryloyloxyethyl) ethyleneimine;
(13) polyamidepolyamine;
(14) polyamideamine epihalohydrin resin;
(15) denatured polyacrylamide as a result of Mannich reaction and denatured polymethacrylamide as a result of Mannich reaction;
(16) polyvinylamine, and a copolymer of vinylamine and an unsaturated monomer copolymerizable with vinylamine;
(17) a condensation polymer of dicyandiamide-diethylenetriamine; etc.

To be more specific, examples of the high molecular weight polyamine include: polyallylamine, polydiallylamine, poly(N-alkylallylamine), poly(alkyldiallylamine), a copolymer of monoallylamine-diallylamine, a copolymer of N-alkylallylamine-monoallylamine, a copolymer of monoallylamine-dialkyldiallylammonium salt, a copolymer of diallylamine-dialkyldiallylammonium salt, polydimethylaminoethyl acrylate, polydiethylaminoethyl acrylate, polydimethylaminoethyl acrylamide, straight-chain polyethyleneimine, branched-chain polyethyleneimine, polyethylenepolyamine, polypropylenepolyamine, polyamidepolyamine, polyetherpolyamine, polyvinylamine, polyamidepolyamine-epichlorohydrin resin, polyamidine, etc. The examples also include amino denatured products produced by reacting formaldehyde and diethylamine with polyacrylamide or polymethacrylamide. Also, the high molecular weight polyamine may be neutralized by an acidic compound either completely or partially.

Examples of the compound having a single functional group reactive with a reaction group contained in the hydrophilic polymer within a molecule and serving as the denaturant include, but are not limited to:

compounds having a hydroxyl group, such as pentanol, hexanol, heptanol, octanol, decanol, alkoxy polyethylene glycol, lactic acid, and ethyl lactate;

compounds having an epoxy group, such as 2-ethylhexylglycidyl ether, phenylglycidyl ether, butylglycidyl ether, 2-methyloctylglycidyl ether, allylglycidyl ether, and glycidyl(meth)acrylate;

compounds having an amino group, such as methylamine, ethylamine, diethylamine, triethylamine, n-propylamine, isopropylamine, diisopropylamine, 3-methoxy propylamine, 3-ethoxy propylamine, 3-(2-ethylhexyloxy)propylamine, 3-(dibutylamino)propylamine, n-butylamine, t-butylamine, sec-butylamine, diisobutylamine, 2-ethylhexylamine, and di-2-ethylhexylamine, tri-n-octylamine, and salts of these compounds;

cationic surfactants having an amino group and salts of such surfactants; etc.

One member or a mixture of more than one member selected from these compounds can be used effectively. Further, a mixture of the compound having a single functional group within a molecule and the compound having a number of functional groups within a molecule may be used as the denaturant of the present invention.

Although an amount of the denaturant with respect to an amount of the hydrophilic polymer varies with the kinds or combination of the hydrophilic polymer and denaturant or the use of the resulting hydrophilic resin, a preferable amount is in a range between 0.001 part by weight and 10 parts by weight with respect to 100 parts by weight of the hydrophilic polymer in solid, and a more preferable amount is in a range between 0.01 part by weight and 5 parts by weight. Limiting an amount of the denaturant within the above range makes it possible to obtain the hydrophilic resin serving as an absorbing agent with an excellent absorbing property under pressure and bonding and shape-keeping properties. If more than 10 parts by weight of the denaturant are used, a part of the denaturant is wasted uneconomically. Also, an excessive denaturant may prevent to realize a desired denaturing (improving) effect. More specifically, in case that the hydrophilic polymer is an absorbent resin and the denaturant is a crosslinking agent, if the crosslinking agent is used excessively, the crosslinking density becomes too high to maintain good absorbency of the resulting absorbing agent, namely, hydrophilic resin. On the other hand, in case less than 0.001 part by weight of the denaturant is used, the desired denaturing effect can be hardly attained.

In case that the liquid denaturant substance of the present invention contains a solvent, examples of the solvent are water, a hydrophilic organic solvent, and a mixture of water and the hydrophilic organic solvent. In other words, in case that the liquid denaturant substance is a solution or dispersing liquid of the denaturant, the liquid denaturant substance can be readily prepared by dissolving or dispersing the denaturant into, for example, water and/or a hydrophilic organic solvent. A concentration of the denaturant in the solution or dispersing liquid is not especially limited.

Examples of the hydrophilic organic solvent include:

lower alcohols, such as methyl alcohol, ethyl alcohol, n-propyl alcohol, isopropyl alcohol, n-butyl alcohol, isobutyl alcohol, and t-butyl alcohol;

ketones, such as acetone;

ethers, such as dioxane, tetrahydrofuran;

amides, such as N,N-dimethylformamide;

sulfoxides, such as dimethyl sulfoxide; etc.

A method of producing a powdery denaturant substance by turning the liquid denaturant substance into powders is not especially limited in the present invention. For example, a method of mixing the liquid denaturant substance with powders of a water-insoluble compound, a method of cooling the liquid denaturant substance to or below the melting point, etc. are applicable.

The powders of the water-insoluble compound are not especially limited as long as the water-insoluble compound remains inactive in response to the reaction of the hydrophilic polymer and denaturant and does not affect the properties of the resulting hydrophilic resin.

Examples of the water-insoluble compound include, but are not limited to:

inorganic powders, such as silicon dioxide, titanium dioxide, aluminum oxide, magnesium oxide, zinc oxide, talc, calcium phosphate, barium phosphate, silicic acid, silicate, clay, diatomaceous earth, zeolite, bentonite, kaolin, hydrotalcite, perlite, isolite, activated clay, silica sand, quartzite, strontium ore, fluorite, and bauxite;

organic powders, such as polyethylene, polypropylene, polyvinyl chloride, polystyrene, polyamide, melamine resin, polymethyl methacrylate, denatured starch, powders of cellulose, ethyl cellulose, sawdust, activated carbon, and tea-leaves;

microscopic powders of absorbent resins; etc.

One member or a mixture of more than one member selected from these water-insoluble compounds can be used effectively. Of all these example water-insoluble compounds, microscopic inorganic powders are preferable, and microscopic powders of clay are more preferable. Also, a preferable particle size of the water-insoluble compound is 1,000 $\mu$m or less, more preferably 500 $\mu$m or less, and most preferably 100 $\mu$m or less.

Although a ratio of the liquid denaturant substance and water-insoluble compound in the powdery denaturant substance varies with the kinds and combination of the denaturant and water-insoluble compound or the use of the resulting hydrophilic resin, a ratio of the liquid denaturant substance (that is, denaturant or a solution or dispersing liquid of the same) with respect to 100 parts by weight of the water-insoluble compound is preferably in a range between 1 part by weight and 1,000 parts by weight, and more preferably in a range between 10 parts by weight and 500 parts by weight. When more than 1,000 parts by weight of the liquid denaturant substance is used, the resulting powdery denaturant substance readily turn into a slurry, and when this happens, the hydrophilic polymer starts to absorb or starts to react with the denaturant contained in the powdery denaturant substance as soon as the hydrophilic polymer and powdery denaturant substance are mixed with each other. Consequently, it has become difficult to distribute the denaturant uniformly over the surface of the hydrophilic polymer, thereby making it impossible to attain desired denaturating effect. For example, in case that the hydrophilic polymer and denaturant are an absorbent resin and a crosslinking agent, respectively, an absorbing agent (hydrophilic resin) having an excellent absorbing property under pressure and bonding and shape-keeping properties can not be obtained. Likewise, when less than 1 part by weight of liquid denaturant substance is used, the desired denaturing effect can not be attained, either.

A method of mixing the liquid denaturant substance and water-insoluble compound is not especially limited, and a method of simply mixing the denaturant and water-insoluble compound, a method of mixing a solution or dispersing liquid of the denaturant and the water-insoluble compound, etc. are applicable. In case that a solution or dispersing liquid of the denaturant and the water-insoluble compound are mixed, the solution or dispersing liquid in the denaturant substance is generally sprayed or dropped on the water-insoluble compound first, and thence the solution or dispersing liquid and water-insoluble compound are mixed with each other.

Examples of a mixing apparatus used for mixing the liquid denaturant substance and water-insoluble compound include: a cylindrical mixer, a screw type mixer, a screw type extruder, a turbulizer, a nauter type mixer, a V-shaped mixer, a ribbon type mixer, a two-arm type kneader, a fluidized mixer, a flash type mixer, a rotary disk mixer, a roll mixer, a rotary mixer, etc. The mixing speed can be either high or low. In case that the liquid denaturant substance is a solution or dispersing liquid of the denaturant, water and/or hydrophilic organic solvent are removed when the mixing with the water-insoluble compound ends.

As has been explained, the powdery denaturant substance of the present invention is obtained by mixing the liquid denaturant substance and water-insoluble compound. It is preferable that the powdery denaturant substance is in the form of particles. Generally, a particle size of the powdery denaturant substance is ½ or less, and preferably ⅕ or less of the average particle size of the hydrophilic polymer. When the powdery denaturant substance is produced, the kinds or particle size of the water-insoluble compound and mixing conditions of the water-insoluble compound and liquid denaturant substance are selected arbitrary depending on, for example, the intended use of the resulting hydrophilic resin. According to the above arrangement, it has become possible to obtain the powdery denaturant substance which not only denatures the hydrophilic polymer more uniformly, but also further facilitates the control of the denaturation timing.

In addition, in case that the denaturant remains in the liquid state at room temperature, the powdery denaturant substance can be obtained by cooling the liquid denaturant substance to or below a melting point to turn the same into a solid.

A method of mixing the hydrophilic polymer and powdery denaturant substance is not especially limited in the present invention. A mixing apparatus used for mixing the hydrophilic polymer and powdery denaturant substance can be any of the aforementioned example mixing apparatuses. The mixing speed can be either high or low.

According to the present invention, the hydrophilic polymer and denaturant can be mixed homogeneously by the step of mixing the hydrophilic polymer and powdery denaturant substance. Consequently, it has become possible to readily obtain the hydrophilic resin with an excellent balance of properties. In addition, if the heat treatment (heating step) is carried out optionally subsequent to the mixing step to heat the resulting mixture, the hydrophilic polymer and denaturant can react with each other efficiently. Further, if a liquid or gas of an aqueous liquid is added to the resulting mixture before the optional heat treatment and after the mixing step, the hydrophilic polymer and denaturant can also react with each other efficiently. In other words, to denature the hydrophilic polymer with the powdery denaturant substance, the hydrophilic polymer and powdery denaturant substance are mixed with each other, and the hydrophilic polymer and the denaturant contained in the powdery denaturant substance are brought into contact with each other by an adequate means, such as adding an aqueous liquid and/or heating.

A liquid or gas of the aqueous liquid is, for example, water, vapor, a mixed solution of water and a hydrophilic organic solvent, etc. The hydrophilic organic solvent is not especially limited, and can be any of the aforementioned example compounds. In case that a covalent bonding is formed as a result of the reaction of the denaturant and hydrophilic polymer, and for example, when the denaturant is a polyhydric alcohol, polyepoxide, alkylene carbonate or the like, an absorbing agent having a more excellent absorbing property under pressure can be obtained as the hydrophilic resin by adding the aqueous liquid to the mixture of the hydrophilic polymer and powdery denaturant substance. In this case, an amount of water contained in the aqueous liquid varies with a chemical make-up or average particle size of the hydrophilic polymer, a chemical make-up of the powdery denaturant substance, or the intended use of the resulting hydrophilic resin, but a preferable amount with respect to 100 parts by weight of the hydrophilic polymer in solid is 10 parts by weight or less, and a more preferable amount is in a range between 1 part by weight and 5 parts by weight. Likewise, an amount of the hydrophilic organic solvent contained in the aqueous liquid is preferably 10 parts by weight or less, and more preferably in a range between 0.1 part by weight and 5 parts by weight with respect to 100 parts by weight of the hydrophilic polymer in solid. A method of adding the aqueous liquid is not especially limited.

Although a treatment temperature in the heating treatment varies with the kinds of the denaturant or the like, the treatment temperature is preferably 80° C. or higher, more preferably in a range between 100° C. and 230° C., and most preferably in a range between 160° C. and 220° C. The surface of the hydrophilic polymer is denatured by the heat treatment. When the treatment temperature is below 80° C., it becomes difficult to denature the hydrophilic polymer uniformly, and therefore, if the resulting hydrophilic resin is used as an absorbing agent, the absorbing property under pressure of the absorbing agent is hardly improved. In addition, since the heat treatment takes a long time, the productivity of the hydrophilic resin is reduced. The heat treatment is carried out by a typical dryer or furnace. Examples of the dryer include: a channel mixing dryer, a rotary dryer, a disk dryer, a fluidized-bed dryer, a flash type dryer, an infra-red dryer, etc. The heat treatment can be carried out while the hydrophilic polymer and powdery denaturant are being mixed with each other. In short, the mixing step and heat treatment can be carried out in parallel.

As has been explained, the producing method of the hydrophilic resin of the present invention is the method including the mixing step of mixing the hydrophilic polymer and the powdery denaturant substance made from a liquid denaturant substance, and optionally the heating step of heating the mixture obtained in the mixing step. The hydrophilic polymer and liquid denaturant substance are, for example, an absorbent resin containing an acidic group and a crosslinking agent, respectively.

According to the above method, the liquid denaturant substance absorbed in the powdery denaturant substance resides on the surface or inside the water-insoluble compound. For this reason, the liquid denaturant substance can be mixed with the hydrophilic polymer while remaining substantially in the solid state. Thus, according to the above method, the hydrophilic polymer and the liquid denaturant substance, in effect, the powdery denaturant substance, can be mixed with each other more homogeneously compared with the method of mixing the liquid denaturant substance directly with the hydrophilic polymer. The hydrophilic polymer and liquid denaturant substance reside separately in the mixture of the hydrophilic polymer and powdery denaturant substance. In other words, in case that the liquid denaturant substance is made into a powdery denaturant substance, the hydrophilic polymer neither starts to absorb the liquid denaturant substance contained in the powdery denaturant substance nor starts to react with the denaturant contained in the liquid denaturant substance as soon as the hydrophilic polymer and powdery denaturant substance are mixed with each other. The hydrophilic polymer and the denaturant contained in the liquid denaturant substance are brought into contact with each other when the hydrophilic resin has absorbed the aqueous liquid or is heated, thereby making it possible to denature the hydrophilic polymer uniformly.

In case that the powdery denaturant substance is produced by cooling the liquid denaturant substance to or below the melting point, the liquid denaturant substance can be mixed with the hydrophilic polymer while remaining substantially in the solid state. Since the denaturant is contained in the powdery denaturant substance, the hydrophilic polymer and denaturant reside in the hydrophilic resin separately until it is practically used, thereby remaining inactive with each other. When the powdery denaturant substance is fused, the hydrophilic polymer and denaturant are brought into contact and react with each other, whereupon the hydrophilic polymer is denatured (for example, in case that a crosslinking agent is used as the liquid denaturant substance, the surface of the hydrophilic polymer is crosslinked). A method of fusing the powdery denaturant substance is not especially limited, and heat treatment or the like can be adopted.

As has been explained, according to the above producing method, not only the hydrophilic polymer can be denaturated uniformly, but also the denaturation timing can be controlled. For example, according to the above producing method, when the liquid denaturant substance is polyhydric alcohol, polyepoxide, alkylene carbonate, etc., better properties, such as the absorbing property under pressure, can be developed by the denaturation. Particularly, when a crosslinking agent containing a polyamine or the like is used as the denaturant, the bonding ability among the particles of the hydrophilic polymer and the aforementioned shape-keeping ability develop when the hydrophilic resin has absorbed the aqueous liquid during practical use. Further, in this case, the timing of interaction of the particles of the hydrophilic polymer triggered by the polyamine or the like can be controlled. Consequently, the deterioration of the properties, such as gel breaking strength, over time can be prevented more efficiently.

Thus, according to the above arrangement, it has become possible to provide a hydrophilic resin which has an excellent absorbing property under pressure, such as absorbency or water retaining ability under pressure, and shows excellent performance (absorbing property) even when used in the sanitary goods or the like including a high percent by weight of the hydrophilic polymer (resin concentration). In the hydrophilic resin, a liquid introduction space, through which the aqueous liquid migrates to the inside of the hydrophilic polymer, is secured under pressure. Thus, even when 50 wt % or more of the hydrophilic polymer is used, the liquid introduction space can be secured under pressure as well.

Also, according to the above arrangement, it has become possible to provide a hydrophilic resin which has an excellent absorbing property under pressure, prevents the hydrophilic polymer contained therein from releasing from the absorbent material, and maintains its bonding property over time after the production until being put into actual use. The hydrophilic resin contains the hydrophilic polymer and liquid denaturant substance, and when the liquid denaturant substance is the powdery denaturant substance produced by making a crosslinking agent having polyamine or the like into powders, the above-described effect is more significant.

When an absorbing agent is obtained as the hydrophilic resin of the present invention, the absorbing agent is used after being combined with, for example, cellulose fibers, such as paper and comminuted pulp. The absorbing agent has an excellent dispersing ability for the aqueous liquid and does not get wet much. Moreover, since the absorbing agent has an excellent absorbing property, the absorbing agent can be extensively used for sanitary goods, such as paper diapers, sanitary napkins, assisting material for incontinent patients, such as incontinence pads, wound protectors, and wound healing materials, to absorb body fluids; drip absorbing materials to absorb drip from foods or the like, or freshness preserving materials; water-retaining materials for soil to keep water in soil; water stopping materials; etc.

THE BEST MODE OF EMBODIMENT OF THE PRESENT INVENTION

Figure 1:
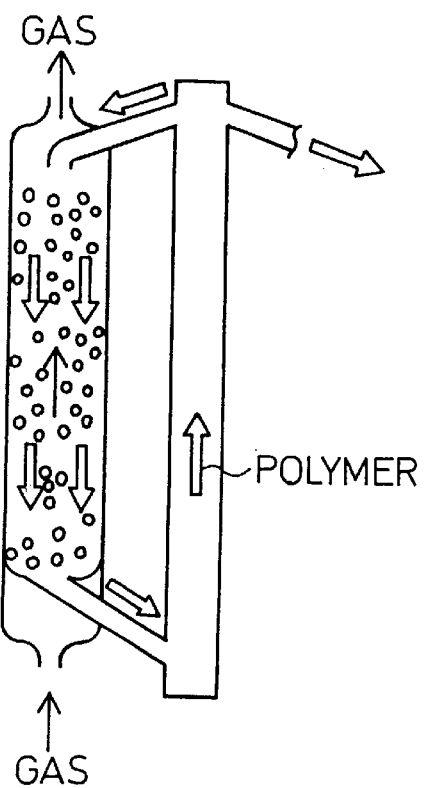
FIG. 1 is a view explaining a schematic structure of a reacting apparatus suitably used for a first denaturing method of the present invention.
Figure 2:
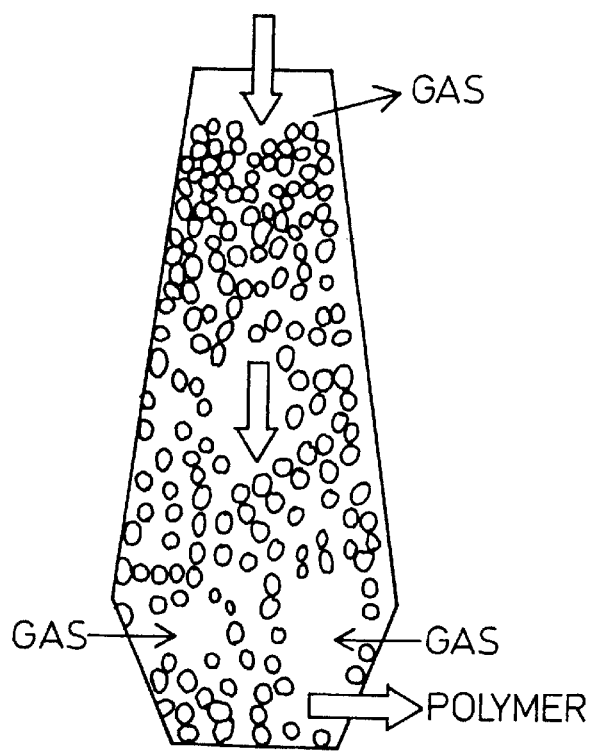
FIG. 2 is a view explaining a schematic structure of another reacting apparatus suitably used for the first denaturing method of the present invention.
Figure 3:
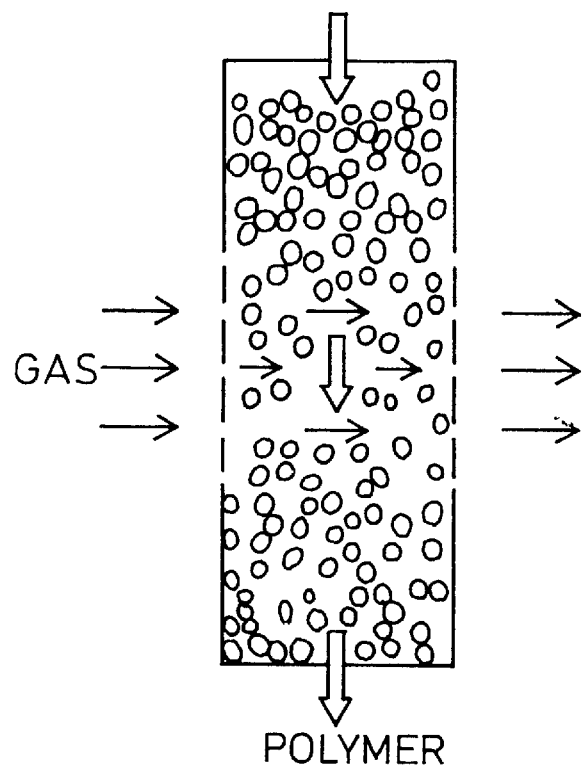
FIG. 3 is a view explaining a schematic structure of a further reacting apparatus suitably used for the first denaturing method of the present invention.
Figure 4:
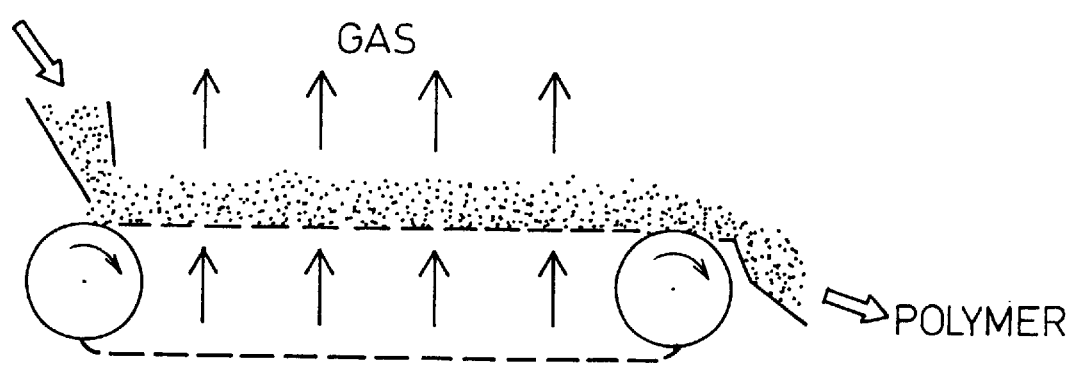
FIG. 4 is a view explaining a schematic structure of still another reacting apparatus suitably used for the first denaturing method of the present invention.
Figure 5:
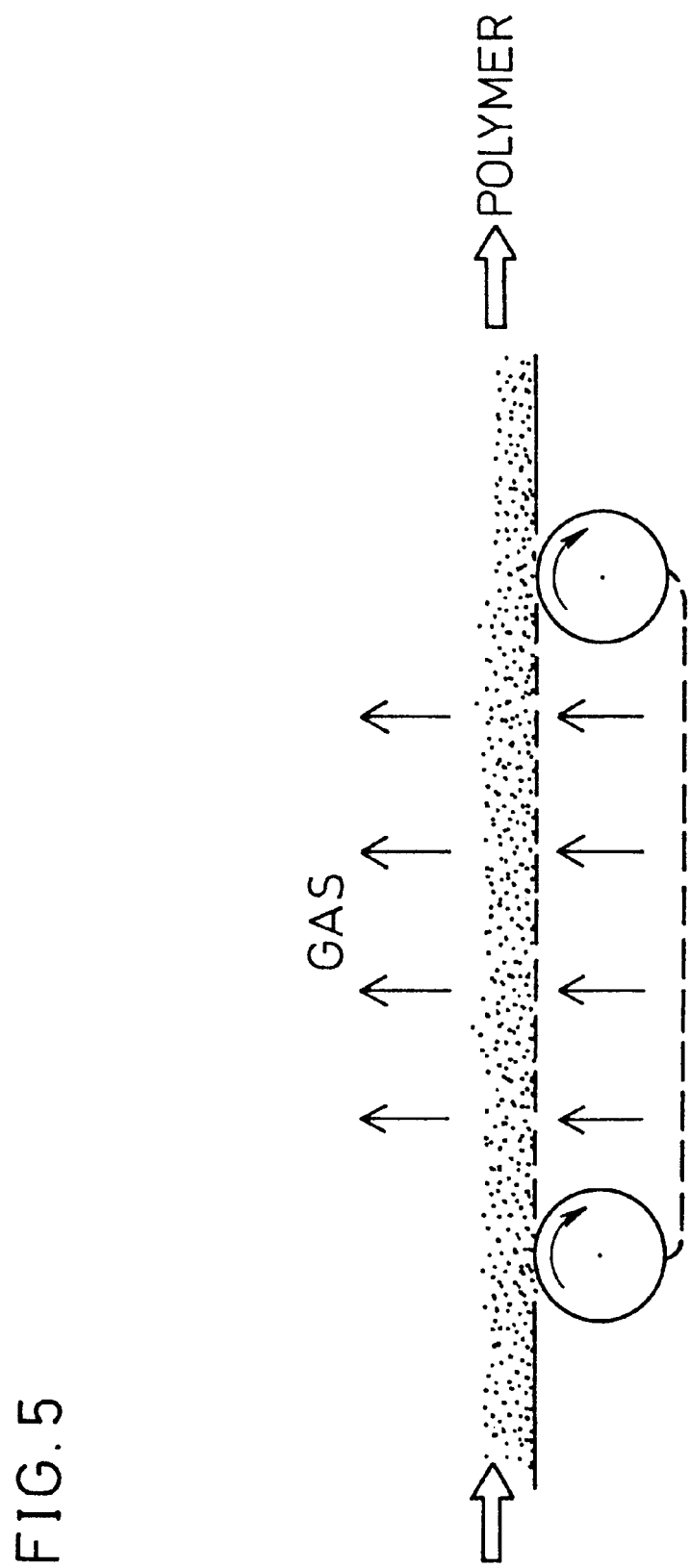
FIG. 5 is a view explaining a schematic structure of still another reacting apparatus suitably used for the first denaturing method of the present invention.
Figure 6:
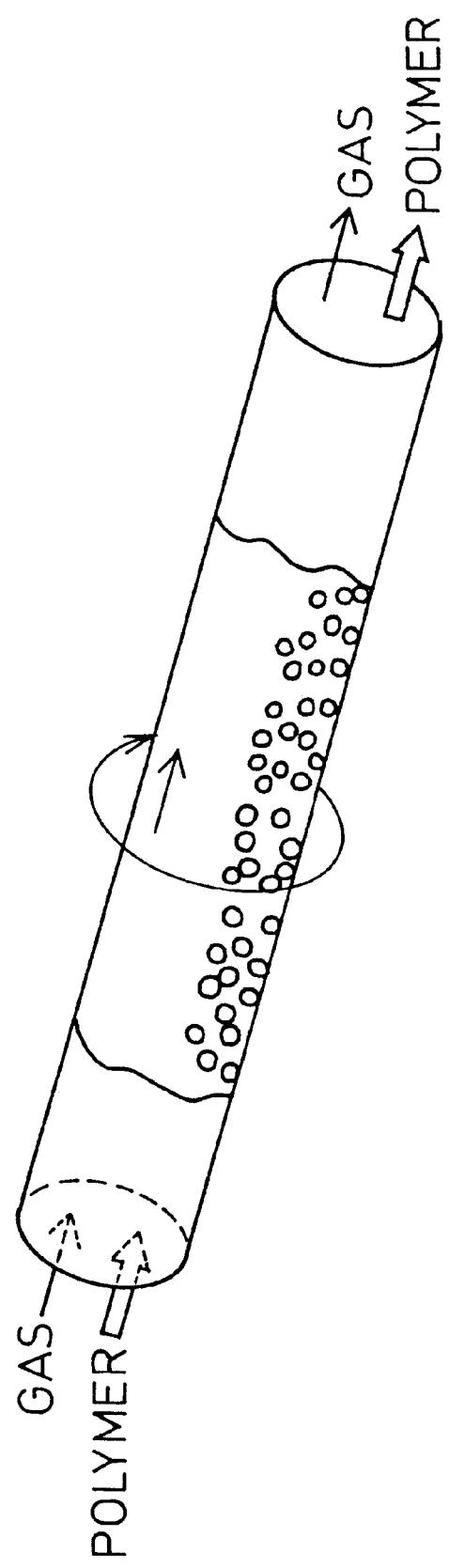
FIG. 6 is a view explaining a schematic structure of still another reacting apparatus suitably used for the first denaturing method of the present invention.
Figure 7:
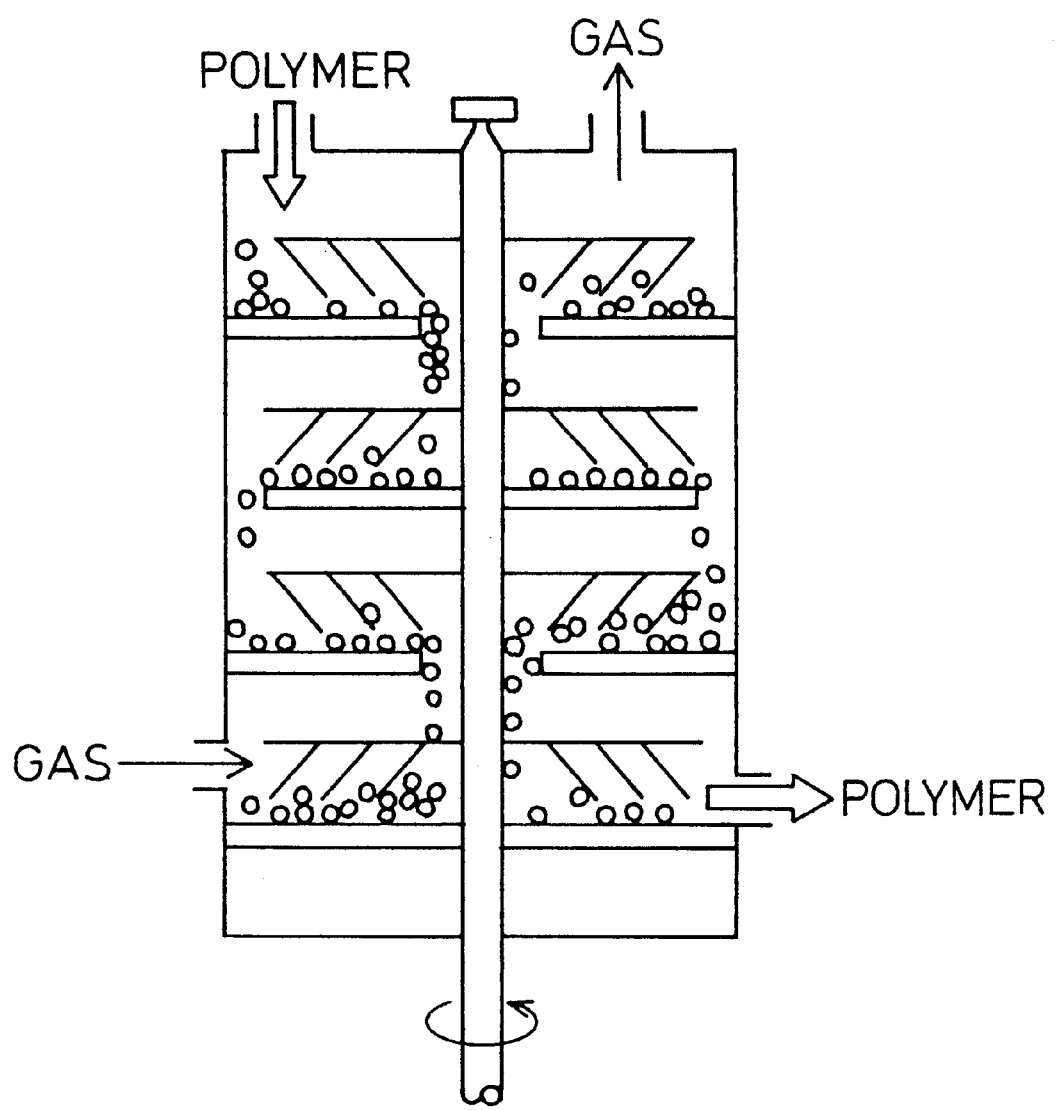
FIG. 7 is a view explaining a schematic structure of still another reacting apparatus suitably used for the first denaturing method of the present invention.
Figure 8:
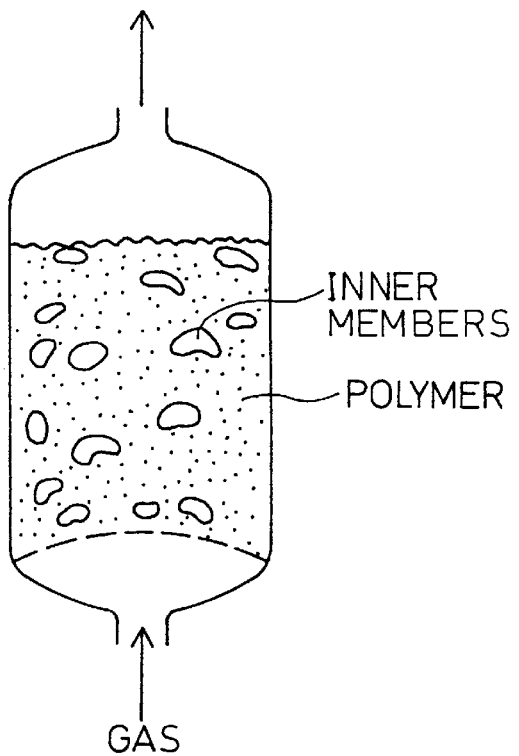
FIG. 8 is a view explaining a schematic structure of still another reacting apparatus suitably used for the first denaturing method of the present invention.
Figure 9:
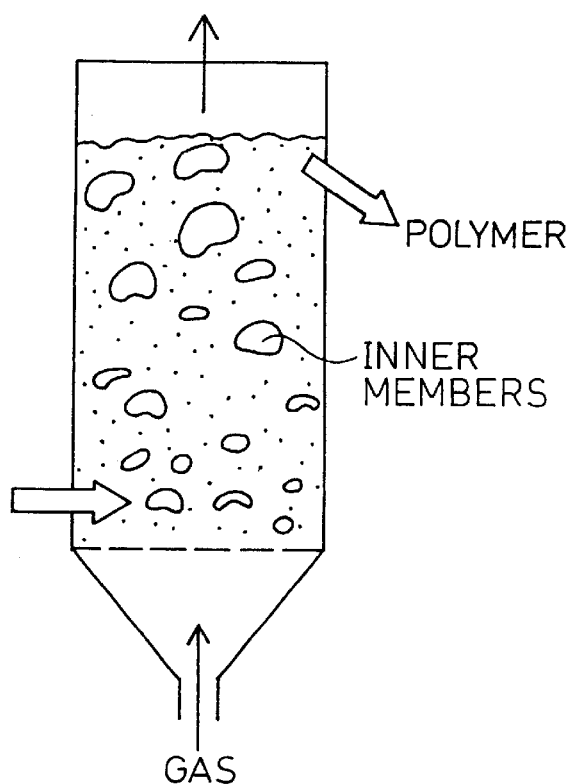
FIG. 9 is a view explaining a schematic structure of still another reacting apparatus suitably used for the first denaturing method of the present invention.
Figure 10:
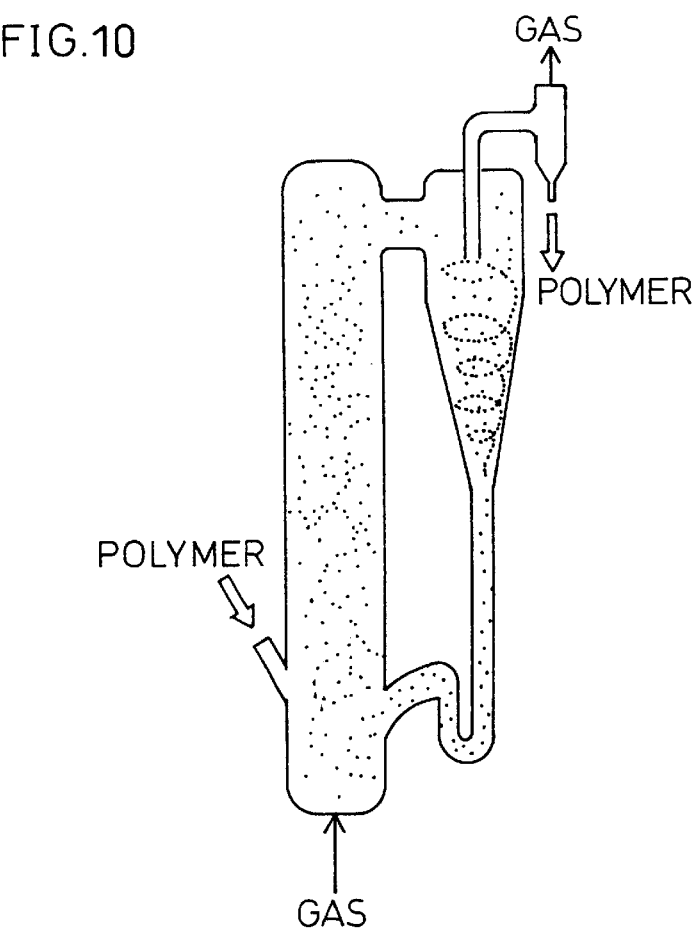
FIG. 10 is a view explaining a schematic structure of still another reacting apparatus suitably used for the first denaturing method of the present invention.
Figure 11:
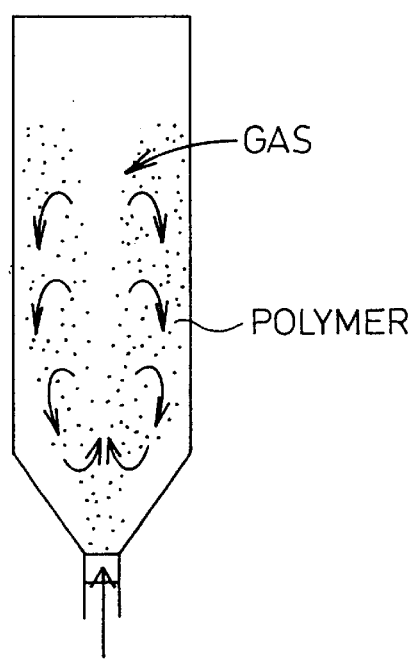
FIG. 11 is a view explaining a schematic structure of still another reacting apparatus suitably used for the first denaturing method of the present invention.
Figure 12:
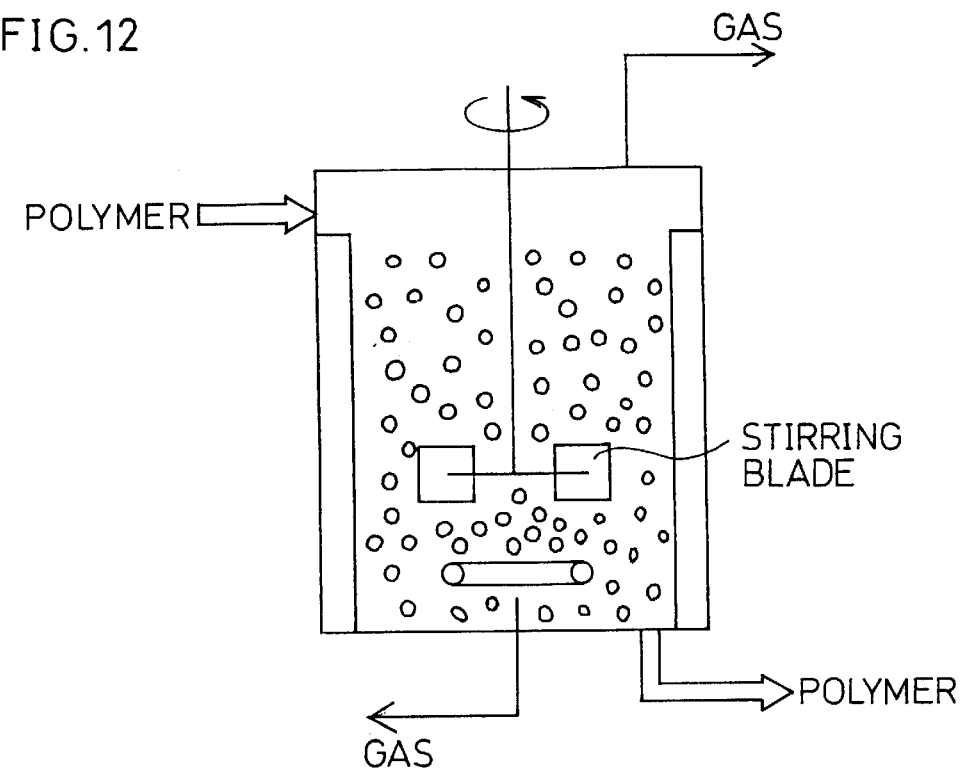
FIG. 12 is a view explaining a schematic structure of still another reacting apparatus suitably used for the first denaturing method of the present invention.
Figure 13:
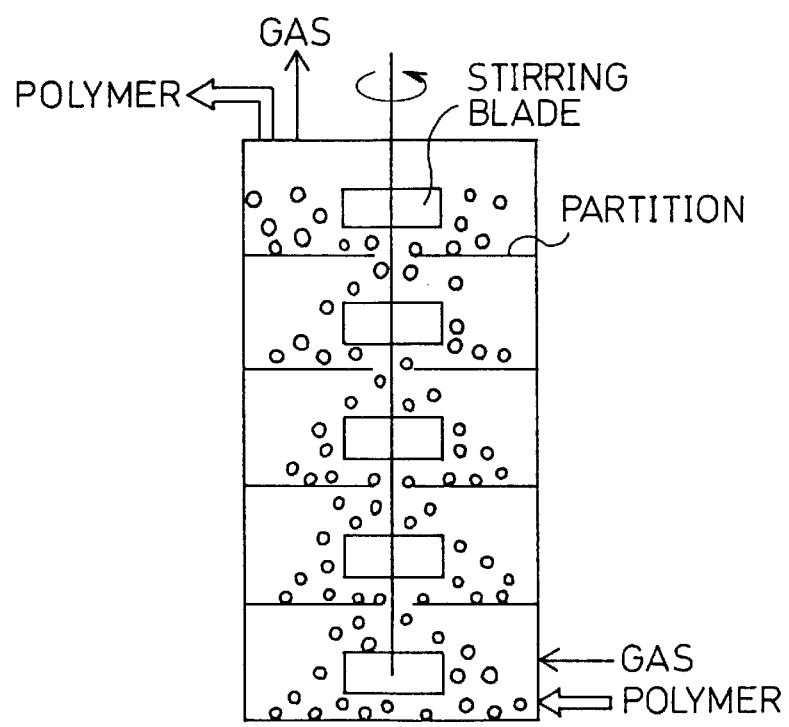
FIG. 13 is a view explaining a schematic structure of still another reacting apparatus suitably used for the first denaturing method of the present invention.
Figure 14:
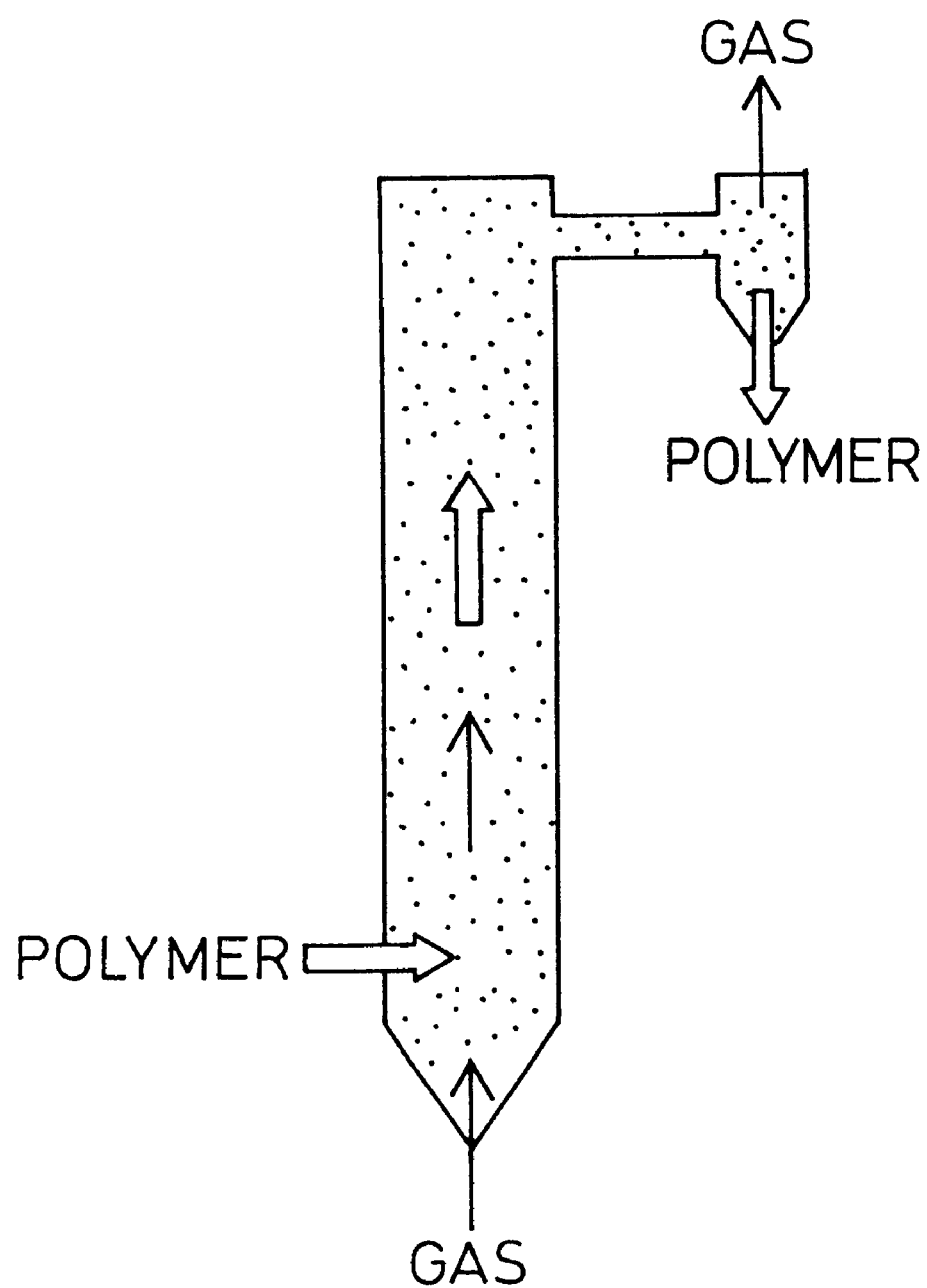
FIG. 14 is a view explaining a schematic structure of still another reacting apparatus suitably used for the first denaturing method of the present invention.

The present invention will be described in detail in the following by ways of Examples and Comparative Examples; however, the present invention is not limited to the following disclosure. Also, six kinds of absorbent resins serving as the hydrophilic polymer are produced in the following manner, and the abilities (physical properties) of the resulting hydrophilic polymers and denatured hydrophilic resins (which are collectively referred to as an absorbing agent in some occasions) are measured in the manner described below. Note that the "part(s)" and "%" respectively mean "part(s) by weight" and "percent by weight" unless otherwise specified.

(1) Producing Method of Hydrophilic Polymer

Six kinds of absorbent resins are produced as the hydrophilic polymer by the following producing methods (a) through (f), respectively.

(a) Here, 5,000 parts of 30 wt % sodium acrylate aqueous solution with a neutralization ratio of 70 mol % is placed in a reactor applicable to a so-called nitrogen gas sealing and cooling/heating. More specifically, an aqueous solution made of 371 parts of acrylic acid and 1,129 parts of sodium acrylate serving as the hydrophilic monomer, and 3,500 parts of water is placed in the reactor.

Then, 6.76 parts of polyethylene glycol diacrylate serving as the internal crosslinking agent is dissolved into the above aqueous solution, and a nitrogen gas is blown into the resulting aqueous solution (bubbling) for 30 minutes to eliminate oxygen dissolved in the aqueous solution. Then, 1.8 part of potassium persulfate serving as the radical polymerization initiator and 0.09 part of L-ascorbic acid serving as the reducing agent are added to the aqueous solution with stirring. Then, the aqueous solution is allowed to polymerize at 30° C. in a nitrogen gas flow.

The temperature inside the reactant system rises to 70° C. after 5 minutes or so since the polymerization took place. Then, the reactant solution is stirred for 2 hours while the reactant system is heated to keep the inside temperature at approximately 70° C. to complete the polymerization reaction. Consequently, hydrous gel of crosslinked polymer made of sodium polyacrylate is obtained.

The hydrous gel of crosslinked polymer is taken out and divided minutely with a meat chopper. The divided product is spread across a 60-mesh metal gauze and dried with a hot air at 150° C. for 135 minutes using a hot air dryer. Then, the dried product is pulverized with a coffee mill, and sieved through a 20-mesh (the size of each mesh: 840 $\mu$m) metal gauze. Consequently, particles of a crosslinked polymer having an average particle size of approximately 400 $\mu$m, that is, an absorbent resin (hereinafter, referred to as absorbent resin (a)), is obtained as the hydrophilic polymer. The absorbent resin (a) is neither moist nor viscous, but dry and smooth.

(b) Here, an aqueous solution is prepared by dissolving 1,000 parts of acrylic acid serving as the hydrophilic monomer and 5 parts of tetraallyloxyethane serving as the internal crosslinking agent into 3,500 parts of water and mixed with each other in a reactor applicable to a so-called nitrogen gas sealing and cooling/heating. Then, a nitrogen gas is blown into the resulting aqueous solution (bubbling) for 30 minutes to eliminate oxygen dissolved in the aqueous solution. Then, 6 parts of hydrogen peroxide and 1 part of 2,2'-azobis(2-amidino propane)dihydrochloride both serving as the radical polymerization initiator, and 0.3 part of L-ascorbic acid are added to the aqueous solution with stirring. Then, the aqueous solution is allowed to polymerize at 25° C. in a nitrogen gas flow. The reactant solution is stirred for approximately 2 hours while the temperature inside the reactant system is kept at a constant level to complete the polymerization reaction. Consequently, hydrous gel of crosslinked polymer made of polyacrylic acid is obtained.

Then, after the resulting hydrous gel of crosslinked polymer is taken out and divided minutely, 868 parts of 48 wt % sodium hydroxide aqueous solution is added to the divided product and kneaded homogeneously to neutralize approximately 75 mol % of carboxyl groups contained in the resulting polymer. In other words, approximately 75 mol % of carboxyl groups contained in the resulting polymer is made into a sodium salt.

The partially neutralized hydrous gel of crosslinked polymer is taken out, and dried at 150° C. with a drum dryer. Then, the dried product is pulverized with a coffee mill and sieved through a 20-mesh metal gauze. Consequently, particles of a crosslinked product having an average particle size of approximately 410 $\mu$m, namely, an absorbent resin (hereinafter referred to as absorbent resin (b)), is obtained as the hydrophilic polymer. The absorbent resin (b) is neither moist nor viscous, but dry and smooth.

(c) Here, 5,000 parts of 35 wt % sodium acrylate aqueous solution with a neutralization ratio of 80 mol % is placed in a reactor applicable to a so-called nitrogen gas sealing and cooling/heating. More specifically, an aqueous solution made of 281 parts of acrylic acid and 1,469 parts of sodium acrylate serving as the hydrophilic monomer, and 3,250 parts of water are placed in the reactor.

Then, 2.2 parts of N,N'-methylenebisacrylamide serving as the internal crosslinking agent is dissolved into the aqueous solution, and a nitrogen gas is blown into the resulting aqueous solution (bubbling) for 30 minutes to eliminate oxygen dissolved in the aqueous solution. Then, 4 parts of 2,2'-azobis(2-amidino propane)dihydrochloride is added to the aqueous solution with stirring, and the aqueous solution is stirred further for 5 minutes. Then, the aqueous solution turns to white, and the production of white microscopic particles of 2,2'-azobis(2-amidino propane)diacrylate is acknowledged in the reactant system.

Immediately, 1.8 part of potassium persulfate and 0.09 part of L-ascorbic acid are added to the aqueous solution with stirring. Then, the aqueous solution is allowed to polymerize at 25° C. in a nitrogen gas flow.

The temperature inside the reactant system rises to 80° C. after 5 minutes or so since the polymerization took place. Then, the reactant solution is stirred for 2 hours while the reactant system is heated to keep the inside temperature at approximately 75° C. to complete the polymerization reaction. Consequently, hydrous gel of crosslinked polymer made of sodium polyacrylate is obtained.

The hydrous gel of crosslinked polymer is taken out and divided minutely with a meat chopper. The divided product is spread across a 60-mesh metal gauze and dried with a hot air at 150° C. for 125 minutes using a hot air dryer. Then, the dried product is pulverized with a coffee mill, and sieved through a 20-mesh metal gauze. Consequently, particles of a crosslinked polymer having an average particle size of approximately 400 $\mu$m, that is, an absorbent resin (hereinafter, referred to as absorbent resin (c)), is obtained as the hydrophilic polymer. Since 2,2'-azobis(2-amidinopropane)diacrylate can also serve as a foaming agent, the absorbent resin (c) is a porous resin having pores with an average diameter of 50 $\mu$m. In addition, the absorbent resin (c) is neither moist nor viscous, but dry and smooth.

(d) The absorbent resin (b) obtained in the producing method (b) above is further sieved through a 100-mesh (the size of each mesh: 150 $\mu$m) metal gauze, and a substance having passed through a 93-mesh metal gauze is obtained as an absorbent resin (hereinafter, referred to as absorbent resin (d)). The absorbent resin (d) is neither moist nor viscous, but dry and smooth.

(e) Here, 3.59 g of trimethylolpropane triacrylate serving as the internal crosslinking agent is dissolved into 5,500 g of 39 wt % sodium acrylate (hydrophilic monomer) aqueous solution with a neutralization ratio of 75 mol % to prepare a reactant solution. Then, the reactant solution is deaerated for 30 minutes under a nitrogen gas atmosphere. Subsequently, the resulting reactant solution is supplied to a reactor, which is a stainless lidded two-arm type kneader of 10 l equipped with two sigma blades and a jacket. Then, the reactant system is displaced by introducing a nitrogen gas while keeping the reactant solution at 30° C. Then, 2.4 g of ammonium persulfate and 0.12 g of L-ascorbic acid both serving as the polymerization initiator are added to the reactant solution with stirring, and the resulting reactant solution starts to polymerize after 1 minute. The polymerization proceeds at 30° C.–80° C. and completes 60 minutes later, after which the resulting hydrous gel of polymer is taken out.

The resulting hydrous gel of polymer is divided minutely to have a particle size of approximately 5 mm. The divided hydrous gel of polymer is spread across a 50-mesh metal gauze and heated and dried at 150° C. for 90 minutes. The resulting dry product is pulverized with a vibrating mill, and sieved through a 20-mesh metal gauze. Consequently, an absorbent resin precursor having an average particle size of 400 μm is obtained and 5 wt % of which is the particles having a particle size smaller than 106 μm.

Next, a solution of a surface crosslinking agent made of 0.5 part of glycerin serving as the crosslinking agent, 3 parts of water, and 0.75 part of isopropyl alcohol serving as the hydrophilic organic solvent is mixed with 100 parts of the resulting absorbent resin precursor. The resulting mixture is heated at 200° C. for 35 minutes, and consequently, an absorbent resin (hereinafter, referred to as absorbent resin (e)) is obtained as the hydrophilic polymer. The resulting absorbent resin (e) has an average particle size of 400 μm and 3% of which is particles having a particle size smaller than 106 μm.

(f) Here, 3.56 g of polyethylene glycol diacrylate serving as the internal crosslinking agent is dissolved into 5,500 g of 33 wt % sodium acrylate (hydrophilic monomer) aqueous solution with a neutralization ratio of 75 mol % to prepare a reactant solution. Then, the reactant solution is deaerated under a nitrogen gas atmosphere. Then, 2.4 g of ammonium persulfate and 0.12 g of L-ascorbic acid both serving as the polymerization initiator are added to the reactant solution with stirring to start the polymerization. When the polymerization ends, the resulting hydrous gel of polymer is divided minutely and dried at 150° C. in the hot air dryer until an amount of water contained therein drops to 5% or less. Then, the dried product is pulverized with a roll granulator and sieved through a 20-mesh metal gauze. Consequently, particles of a crosslinked polymer having an average particle size of 400 μm, namely, an absorbent resin (hereinafter, referred to as absorbent resin (f)), is obtained as the hydrophilic polymer, and 3 wt % of which is the particles having a particle size smaller than 106 μm.

(2) Amount of Retained Water

Here, 0.2 g of the absorbing agent is uniformly placed into a tea-bag sack (60 mm×60 mm) made of non-woven fabric and the opening is heat sealed, after which the tea-bag sack is dipped in a 0.9 wt % sodium chloride aqueous solution (physiological saline solution) at room temperature for 30 minutes. Then, the tea-bag sack is taken out, and subjected to hydro-extraction for 3 minutes at 250 G using a centrifugal separator, after which the weight $W_1$ (g) of the tea-bag sack is measured. Further, the same processes are carried out with an empty tea-bag sack, and the weight $W_0$ (g) of the empty tea-bag sack is measured. The amount of retained water (g/g) is calculated using the weights $W_1$ and $W_0$ on the basis of the following equation:

$$\text{Amount of Retained Water (g/g)} = \frac{\text{Weight } W_1(g) - \text{Weight } W_0(g)}{\text{Weight of Absorbing Agent (g)}}.$$

(3) Absorbency

Here, 0.2 g of the absorbing agent is uniformly placed into a tea-bag sack (60 mm×60 mm) made of non-woven fabric, and dipped in a 0.9 wt % sodium chloride aqueous solution (physiological saline solution) at room temperature for 60 minutes. Then, the tea-bag sack is taken out, and subjected to hydro-extraction for 3 minutes at 250 G using a centrifugal separator, after which the weight $W_1$ (g) of the tea-bag sack is measured. Further, the same processes are carried out with an empty tea-bag sack, and the weight $W_0$ (g) of the empty tea-bag sack is measured. The absorbency (g/g) is calculated using the weights $W_1$ and $W_0$ on the basis of the following equation:

$$\text{Absorbency (g/g)} = \frac{\text{Weight } W_1(g) - \text{Weight } W_0(g)}{\text{Weight of Absorbing Agent (g)}}.$$

(4) Absorbing Amount Under Pressure

Figure 15:
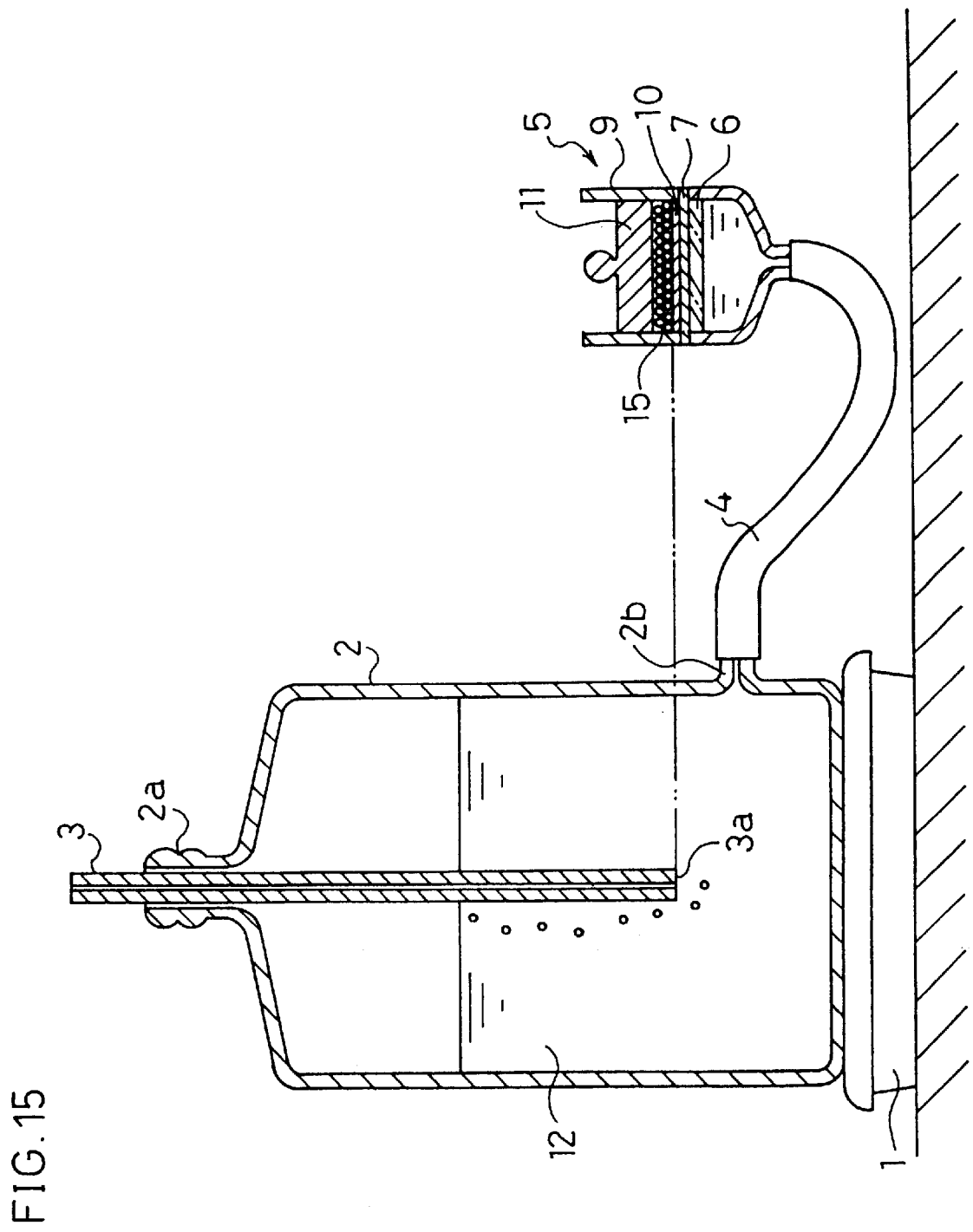
FIG. 15 is a schematic cross section of a measuring device for measuring an amount of absorbed water under pressure, which is one of the abilities of an absorbing agent, namely, a hydrophilic polymer denatured by each denaturing method of the present invention.

To begin with, a measuring apparatus used for measuring an absorbing amount, namely, absorbency, under pressure of the absorbing agent will be explained briefly with reference to FIG. 15.

As shown in the drawing, the measuring apparatus comprises a balance 1, a container 2 of a predetermined capacity placed on the balance 1, an air intaking pipe 3, and a conduit 4 made of silicone resin, a glass filter 6, and a measuring section 5 placed on the glass filter 6. The container 2 has an opening 2a at the top and another opening 2b at the side surface, and the air intaking pipe 3 is inserted through the opening 2a while the conduit 4 is fixed to the opening 2b. Further, a predetermined amount of physiological saline solution (0.9 wt % sodium chloride aqueous solution) 12 is withheld in the container 2. The lower end portion of the air intaking pipe 3 is dipped into the physiological saline solution 12. The air intaking pipe 3 is provided to keep the inside of the container 2 substantially at normal pressure. The glass filter 6 has a diameter of 55 mm. The container 2 and the glass filter 6 communicate with each other through the conduit 4. The glass filter 6 is fixed at predetermined position and height with respect to the container 2.

The measuring section 5 is provided with a paper filter 7, a supporting cylinder 9, a metal gauze 10 affixed to the bottom of the supporting cylinder 9, and a weight 11. In the measuring section 5, the paper filter 7 and supporting cylinder 9 (in effect, the metal gauze 10) are sequentially placed on the glass filter 6 in this order, and the weight 11 is placed on the metal gauze 10 inside the supporting cylinder 9. The metal gauze 10 is made of stainless steel to have a 400-mesh (the size of each mesh: 38 μm). A predetermined amount of an absorbing agent 15 of a certain particle size is uniformly scattered on the metal gauze 10. The upper surface of the metal gauze 10 where the absorbing agent 15 touches the metal gauze 10 is aligned with the lower surface 3a of the air intaking pipe 3. The weight 11 is adjusted in such a manner to apply a load of 50 g/cm² evenly to the metal gauze 10, namely, the absorbing agent 15.

The absorbing amount under pressure is measured using the above-arranged measuring apparatus in the manner described below.

To begin with, preparatory operations are carried out. More specifically, a predetermined amount of physiological saline solution 12 is poured into the container 2, and the air intaking pipe 3 is inserted into the container 2. Then, the paper filter 7 is placed on the glass filter 6. At the same time, 0.9 g of the hydrophilic resin serving as the absorbing agent 15 is uniformly scattered on the metal gauze 10 inside the supporting cylinder 9, and the weight 11 is placed on the absorbing agent 15.

Subsequently, the metal gauze 10, in effect, the supporting cylinder 9 having the absorbing agent 15 and the weight 11 inside, is placed on the paper filter 7 in such a manner that the center of the supporting cylinder 9 is superimposed on the center of the glass filter 6.

Then, the weight $W_2$(g) of the physiological saline solution 12, which has been absorbed by the absorbing agent 15 for 60 minutes since the supporting cylinder 9 was placed on the paper filter 7, is measured by the balance 1. The same procedure is taken without using any absorbing agent 15, and the weight $W_3(g)$ of the physiological saline solution 12 absorbed by the components other than the absorbing agent 15, for example, the paper filter 7, is measured by the balance 1. Then, the absorbing amount (g/g) under pressure is calculated on the basis of the following equation:

$$\text{Absorbing Amount under Pressure (g/g)} = \frac{\text{Weight } W_2(g) - \text{Weight } W_3(g)}{\text{Weight of Absorbing Agent (g)}}.$$

(5) Absorbency Under Pressure

Figure 16:
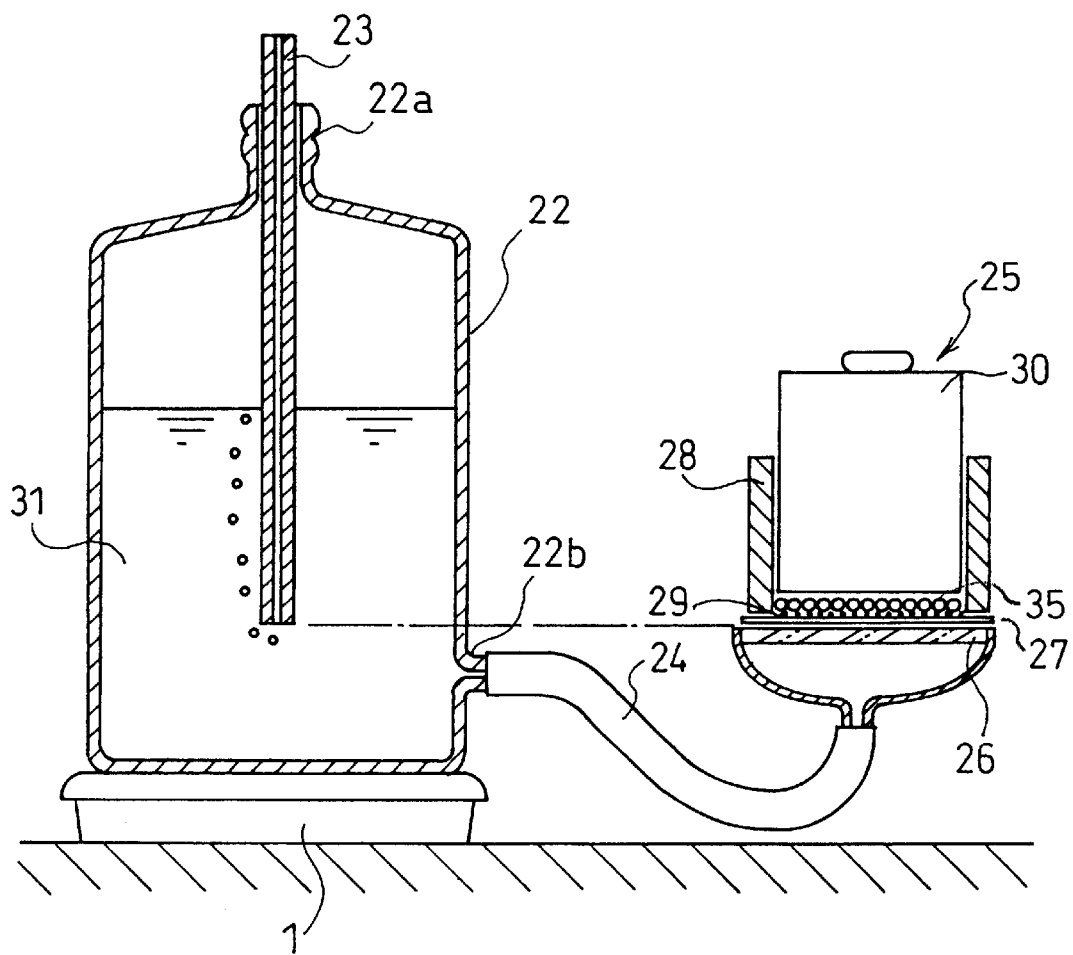
FIG. 16 is a schematic cross section of a measuring device for measuring absorbency under pressure, which is one of the abilities of an absorbing agent, namely, a hydrophilic polymer denatured by each denaturing method of the present invention.

To begin with, a measuring apparatus used for measuring absorbency under pressure will be explained briefly with reference to FIG. 16.

As shown in the drawing, the measuring apparatus comprises a balance 1, and a container 22 of a predetermined capacity placed on the balance 1, an air intaking pipe 23, and a conduit 24, a glass filter 26, and a measuring section 25 placed on the glass filter 26. The container 22 has an opening 22a at the top and another opening 22b at the side surface, and the air intaking pipe 23 is inserted through the opening 22a while the conduit 24 is fixed to the opening 22b. Further, a predetermined amount of a synthetic urine 31 is withheld in the container 22. The synthetic urine 31 is an aqueous solution composed of 0.2% of sodium sulfate, 0.2% of potassium chloride, 0.05% of magnesium chloride hexahydrate, 0.025% of calcium chloride dihydrate, 0.085% of ammonium dihydrogenphosphate, and 0.015% of diammonium hydrogenphospate. The lower end portion of the air intaking pipe 23 is dipped into the synthetic urine 31. The glass filter 26 has a diameter of 70 mm. The container 22 and the glass filter 26 communicate with each other through the conduit 24. The glass filter 26 is fixed to a predetermined position, so that the upper surface of the same is aligned with the lower end of the air intaking pipe 23.

The measuring section 25 is provided with a paper filter 27, a supporting cylinder 28, a metal gauze 29 affixed to the bottom of the supporting cylinder 28, and a weight 30. In the measuring section 25, the paper filter 27 and supporting cylinder 28 (in effect, the metal gauze 29) are sequentially placed on the glass filter 26 in this order, and the weight 30 is placed on the metal gauze 29 inside the supporting cylinder 28. The supporting cylinder 28 is made to have a bore diameter of 60 mm. The metal gauze 29 is made of stainless steel to have a 400-mesh according to JIS, Japanese Industrial Standard (the size of each mesh: 38 $\mu$m). A predetermined amount of an absorbing agent 35 is uniformly scattered on the metal gauze 29. The weight 30 is adjusted in such a manner to apply a load of 50 g/cm$^2$ evenly to the metal gauze 29, namely, the absorbing agent 35.

The absorbency under pressure is measured using the above-arranged measuring apparatus in the manner described below.

To begin with, preparatory operations are carried out. More specifically, a predetermined amount of the synthetic urine 31 is poured into the container 22, and the air intaking pipe 23 is inserted into the container 22. Then, the paper filter 27 is placed on the glass filter 26. At the same time, 0.9 g of an absorbing agent serving as the absorbing agent 35 is uniformly scattered on the metal gauze 29 inside the supporting cylinder 28, and the weight 30 is placed on the absorbing agent 35.

Subsequently, the metal gauze 29, in effect, the supporting cylinder 28 having the absorbing agent 35 and weight 30 inside, is placed on the paper filter 27.

Then, the weight $W_4(g)$ of the synthetic urine 31, which has been absorbed by the absorbing agent 35 for 60 minutes since the supporting cylinder 28 was placed on the paper filter 27, is measured by the balance 1.

Then, the absorbency (g/g) under pressure after 60 minutes since the absorption started is calculated on the basis of the following equation:

$$\text{Absorbency under Pressure } (g/g) = \frac{\text{Weight } W_4(g)}{\text{Weight of Absorbing Agent } (g)}.$$

(6) Gel Breaking Strength

Here, 25.3 g of a synthetic urine and 0.84 g of an absorbing agent are placed in a supporting cylinder having a bore diameter of 50 mm and a height of 13 mm, so that the absorbing agent absorbs the synthetic urine and turns into gel. The synthetic urine has the same chemical make-up explained in the above (5) absorbency under pressure column. Then, the supporting cylinder is placed on a measuring table having a 20-mm-dia. opening at the center in such a manner that the center of the supporting cylinder is superimposed on the center of the measuring table, and breaking strength of the gel inside the supporting cylinder is measured. The breaking strength is measured by a neocard meter of Model No. M-302 of ITEC Corp. under the following conditions: diameter and lowering speed of a pressure sensitive axis is 8 mm and 0.36 cm/sec., respectively. The breaking strength referred to herein means a minimum strength necessary to break an elastic body, namely, the gel inside the supporting cylinder, against the elastic limit.

(7) Gel Breaking Strength and Retention After Gel Breaking Strength Lowering Promotion Test (GBSLPT)

Here, 0.84 g of an absorbing agent is allowed to stand at 40° C. and a relative humidity of 90% for ① 24 hours or ② 48 hours (gel breaking strength lowering promotion test, hereinafter, simply referred to as lowering promotion test). Then, the gel breaking strength is measured using the absorbing agent when the lowering promotion test ends. More specifically, 0.84 g of the absorbing agent and 25.3 g of the synthetic urine are placed in the supporting cylinder having a bore diameter of 50 mm and a height of 13 mm, so that the absorbing agent absorbs the synthetic urine and turns into gel. The breaking strength of the gel thus obtained is measured in the same manner as the above section (6).

The retention (%) referred to herein is a ratio of gel breaking strength (I) with respect to gel breaking strength (II) in percentage, where the gel breaking strength (I) is the gel breaking strength after the lowering promotion test by allowing the absorbing agent to stand for 48 hours at 40° C. and a relative humidity of 90% and the gel breaking strength (II) is the gel breaking strength of the absorbing agent without the lowering promotion test.

EXAMPLE 1

Here, 100 parts of the absorbent resin (a) is placed in an autoclave (treating apparatus) having a capacity of 1 l and equipped with a stirring blade as the hydrophilic polymer, and the reactant system is displaced by introducing a nitrogen gas, after which a pressure inside the reactant system is set to 5 Kgf/cm$^2$ with a nitrogen gas. Then, the inside of the reactant system is heated to 180° C. with stirring, and when the temperature raises to 180° C., 3 parts of ethylene oxide is introduced into the reactant system as the crosslinking agent (denaturant). At this point, a pressure inside the reactant system has risen to 7 Kgf/cm$^2$–8 Kgf/cm$^2$ and ethylene oxide has turned into a gaseous state. Subsequently, the inside of the reactant system is stirred for 10 minutes while being kept at 180° C. to complete the crosslinking treatment (denaturation).

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein.

The infrared absorption spectrum is measured on the surface of the absorbent resin (a) and on the surface of the absorbing agent through the FT-IR (Fourier-Transform Infrared Spectroscopy) method. A measuring apparatus of Model No. FTS-45 of Nippon Bio-Rad Laboratories K.K. is used herein. In addition, the diffuse reflectance spectroscopy (DR) technique is used as a measuring method (sampling method). The infrared absorption spectrum on the surface of the absorbent resin (a) and on the surface of the absorbing agent are shown in the charts of FIGS. 17 and 18, respectively.

Figure 17:
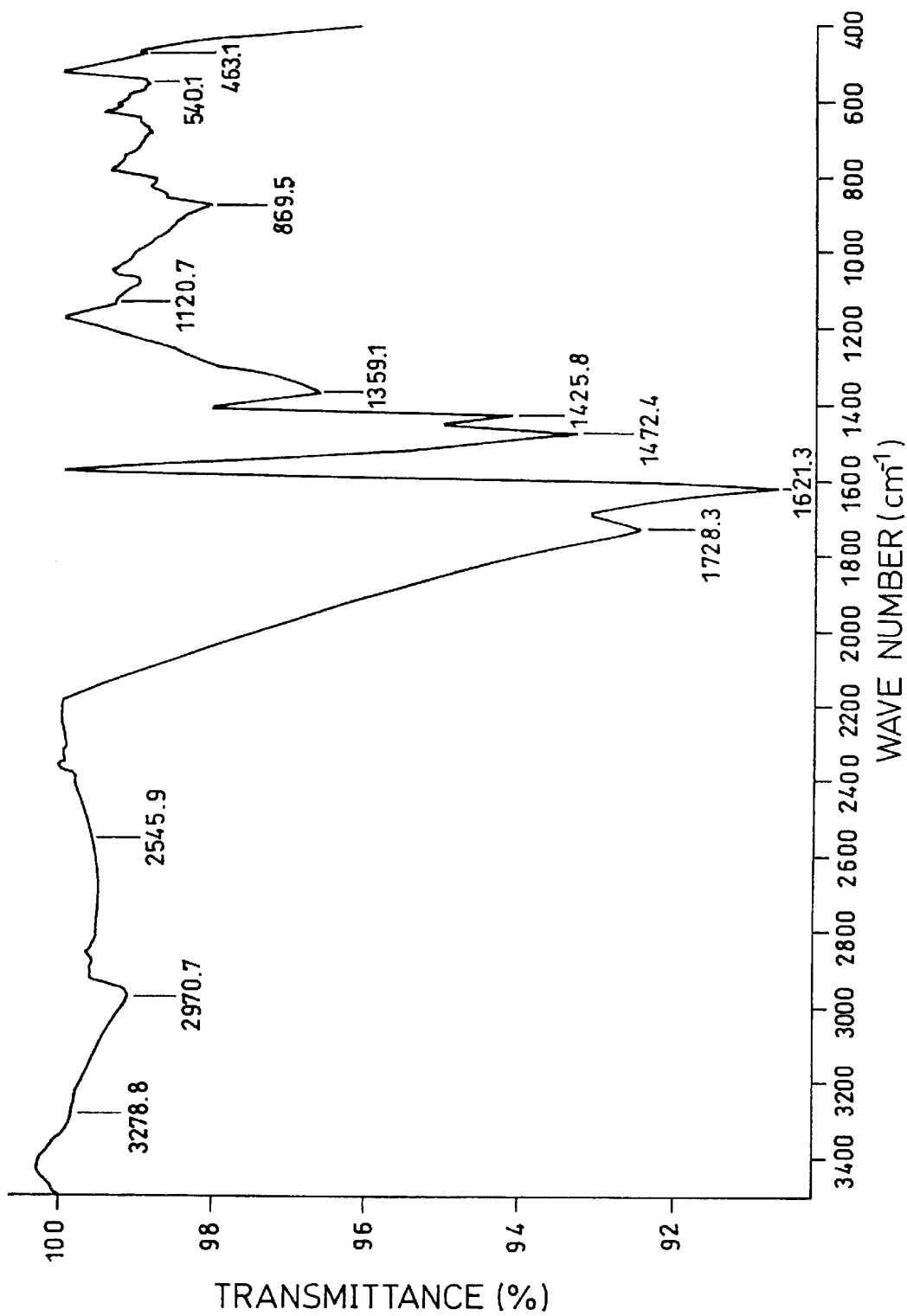
FIG. 17 is an infrared absorption spectrum chart on the surface of an absorbent resin (a) used in an example of the present invention.
Figure 18:
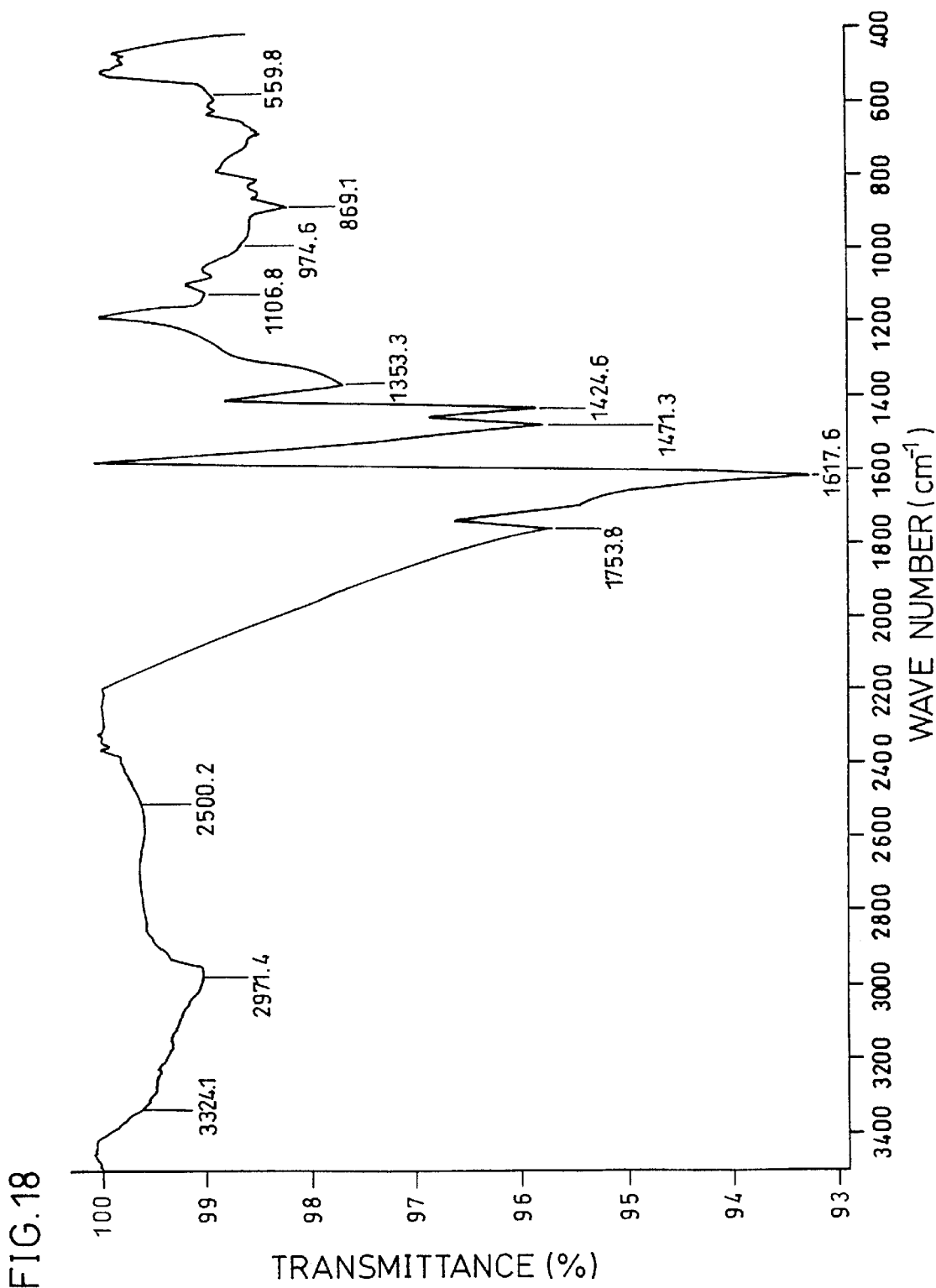
FIG. 18 is an infrared absorption spectrum chart on the surface of an absorbing agent obtained in an example of the present invention.

In the chart of FIG. 17, the absorption peak of the carboxyl group residing on the surface of the absorbent resin (a) appears at $1728.3$ $cm^{-1}$. In contrast, as shown in the chart of FIG. 18, the absorption peak shifts to $1753.8$ $cm^{-1}$ on the surface of the absorbing agent. This means that the carboxyl group residing on the surface of the absorbent resin (a) forms ester with ethylene oxide during the crosslinking treatment. In short, the surface of the absorbent resin (a) is denatured by ethylene oxide.

An amount of retained water and an absorbing amount under pressure of the resulting absorbing agent measured in the above-explained manners are 34 g/g and 21 g/g, respectively. In contrast, an amount of retained water and an absorbing amount under pressure of the absorbent resin (a) also measured in the above-explained manners are 43 g/g and 7 g/g, respectively. The measuring results are set forth in Table 2 below.

EXAMPLE 2

Here, 100 parts of the absorbent resin (b) is placed in an autoclave having a capacity of 1 l and equipped with a stirring blade as the hydrophilic polymer, and the reactant system is displaced by introducing a nitrogen gas, after which a pressure inside the reactant system is set to 5 $Kgf/cm^2$ with a nitrogen gas. Then, the inside of the reactant system is heated to 180° C. with stirring, and when the temperature raises to 180° C., 3 parts of ethylene oxide is introduced into the reactant system. At this point, a pressure inside the reactant system has risen to 7 $Kgf/cm^2$–8 $Kgf/cm^2$ and ethylene oxide has turned into a gaseous state. Subsequently, the inside of the reactant system is stirred for 30 minutes while being kept at 180° C. to complete the crosslinking treatment.

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein.

An amount of retained water and an absorbing amount under pressure of the resulting absorbing agent measured in the above-explained manners are 28 g/g and 21 g/g, respectively. In contrast, an amount of retained water and an absorbing amount under pressure of the absorbent resin (b) also measured in the above-explained manners are 32 g/g and 8 g/g, respectively. The measuring results are set forth in Table 2 below.

EXAMPLE 3

Here, 100 parts of the absorbent resin (c) is placed in an autoclave having a capacity of 1 l and equipped with a stirring blade as the hydrophilic polymer, and the reactant system is displaced by introducing a nitrogen gas, after which a pressure inside the reactant system is set to 5 $Kgf/cm^2$ with a nitrogen gas. Then, the inside of the reactant system is heated to 180° C. with stirring, and when the temperature raises to 180° C., 3 parts of ethylene oxide is introduced into the reactant system. At this point, a pressure inside the reactant system has risen to 7 $Kgf/cm^2$–8 $Kgf/cm^2$ and ethylene oxide has turned into a gaseous state. Subsequently, the inside of the reactant system is stirred for 60 minutes while being kept at 180° C. to complete the crosslinking treatment.

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein.

An amount of retained water and an absorbing amount under pressure of the resulting absorbing agent measured in the above-explained manners are 29 g/g and 22 g/g, respectively. In contrast, an amount of retained water and an absorbing amount under pressure of the absorbent resin (c) also measured in the above-explained manners are 33 g/g and 8 g/g, respectively. The measuring results are set forth in Table 2 below.

EXAMPLE 4

Here, 100 parts of the absorbent resin (a) is placed in an autoclave having a capacity of 1 l and equipped with a stirring blade as the hydrophilic polymer, and the reactant system is displaced by introducing a nitrogen gas, after which a pressure inside the reactant system is set to 4 $Kgf/cm^2$ with a nitrogen gas. Then, the inside of the reactant system is heated to 150° C. with stirring, and when the temperature raises to 150° C., 4.8 parts of ethylene oxide is introduced into the reactant system. At this point, a pressure inside the reactant system has risen to 5 $Kgf/cm^2$ and ethylene oxide has turned into a gaseous state. Subsequently, the inside of the reactant system is stirred for 45 minutes while being kept at 150° C. to complete the crosslinking treatment.

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein. An amount of retained water and an absorbing amount under pressure of the resulting absorbing agent measured in the above-explained manners are 30 g/g and 18 g/g, respectively. The measuring results are set forth in Table 2 below.

EXAMPLE 5

Here, the crosslinking treatment is carried out in the same manner as Example 3 above except that 100 parts of the absorbent resin (a), which has been heated and dried at 180° C. for a predetermined time, is used as the hydrophilic polymer instead of the absorbent resin (c).

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein. An amount of retained water and an absorbing amount under pressure of the resulting absorbing agent measured in the above-explained manners are 29 g/g and 22 g/g, respectively. The measuring results are set forth in Table 2 below.

The above results reveal that the denaturating method of the present invention is not affected whether the hydrophilic polymer contains water or not. In short, it is understood that the result of denaturation is not affected whether the hydrophilic polymer subjected to the denaturation contains water or not.

EXAMPLE 6

The crosslinking treatment is carried out in the same manner as Example 3 above except that 100 parts of the absorbent resin (d) is used as the hydrophilic polymer instead of the absorbent resin (c).

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein.

An amount of retained water and an absorbing amount under pressure of the resulting absorbing agent measured in the above-explained manners are 23 g/g and 11 g/g, respectively. In contrast, an amount of retained water and an absorbing amount under pressure of the absorbent resin (d) also measured in the above-explained manners are 27 g/g and 6 g/g, respectively. The measuring results are set forth in Table 2 below.

EXAMPLE 7

Here, 100 parts of the absorbent resin (a) is placed in an autoclave having a capacity of 1 l and equipped with a stirring blade as the hydrophilic polymer, and the reactant system is displaced by introducing a nitrogen gas, after which a pressure inside the reactant system is set to 5 Kgf/cm$^2$ with a nitrogen gas. Then, the inside of the reactant system is heated to 200° C. with stirring, and when the temperature raises to 200° C., 3 parts of ethylene oxide is introduced into the reactant system. At this point, a pressure inside the reactant system has risen to 7 Kgf/cm$^2$–8 Kgf/cm$^2$ and ethylene oxide has turned into a gaseous state. Subsequently, the inside of the reactant system is stirred for 10 minutes while being kept at 200° C. to complete the crosslinking treatment.

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein. An amount of retained water and an absorbing amount under pressure of the resulting absorbing agent measured in the above-explained manners are 35 g/g and 19 g/g, respectively. The measuring results are set forth in Table 2 below.

EXAMPLE 8

Here, 100 parts of the absorbent resin (a), which has been heated and dried at 180° C. for a predetermined time, is placed in an autoclave having a capacity of 1 l and equipped with a stirring blade as the hydrophilic polymer, and the reactant system is displaced by introducing a nitrogen gas, after which a pressure inside the reactant system is set to 5 Kgf/cm$^2$ with a nitrogen gas. Then, the inside of the reactant system is heated to 200° C. with stirring, and when the temperature raises to 200° C., 3 parts of ethylene oxide is introduced into the reactant system. At this point, a pressure inside the reactant system has risen to 7 Kgf/cm$^2$–8 Kgf/cm$^2$ and ethylene oxide has turned into a gaseous state. Subsequently, the inside of the reactant system is stirred for 60 minutes while being kept at 200° C. to complete the crosslinking treatment.

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein. An amount of retained water and an absorbing amount under pressure of the resulting absorbing agent measured in the above-explained manners are 33 g/g and 22 g/g, respectively. The measuring results are set forth in Table 2 below.

EXAMPLE 9

Here, 100 parts of the absorbent resin (a) is placed in an autoclave having a capacity of 1 l and equipped with a stirring blade as the hydrophilic polymer, and the reactant system is displaced by introducing a nitrogen gas, after which a pressure inside the reactant system is set to 5 Kgf/cm$^2$ with a nitrogen gas. Then, the inside of the reactant system is heated to 220° C. with stirring, and when the temperature raises to 220° C., 3 parts of propylene oxide is introduced into the reactant system as the crosslinking agent (denaturant). At this point, a pressure inside the reactant system has risen to 7 Kgf/cm$^2$–8 Kgf/cm$^2$ and propylene oxide has turned into a gaseous state. Subsequently, the inside of the reactant system is stirred for 60 minutes while being kept at 220° C. to complete the crosslinking treatment (denaturation).

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein. An amount of retained water and an absorbing amount under pressure of the resulting absorbing agent measured in the above-explained manners are 29 g/g and 19 g/g, respectively. The measuring results are set forth in Table 2 below.

EXAMPLE 10

Here, 100 parts of the absorbent resin (a), which has been heated and dried at 180° C. for a predetermined time, is placed in an autoclave having a capacity of 1 l and equipped with a stirring blade as the hydrophilic polymer, and the reactant system is displaced by introducing a nitrogen gas, after which a pressure inside the reactant system is set to 5 Kgf/cm$^2$ with a nitrogen gas. Then, the inside of the reactant system is heated to 240° C. with stirring, and when the temperature raises to 240° C., 3 parts of ethylene oxide is introduced into the reactant system. At this point, a pressure inside the reactant system has risen to 8 Kgf/cm$^2$–9 Kgf/cm$^2$ and ethylene oxide has turned into a gaseous state. Subsequently, the inside of the reactant system is stirred for 3 minutes while being kept at 240° C. to complete the crosslinking treatment.

When the treatment ends, the autoclave is opened and the resulting crosslinked hydrophilic resin is taken out as the absorbing agent. The absorbing agent thus obtained is in the form of particles, and is neither moist nor viscous, but dry and smooth. In addition, the production of agglomerate is not acknowledged herein. An amount of retained water and an absorbing amount under pressure of the resulting absorbing agent measured in the above-explained manners are 30 g/g and 22 g/g, respectively. The measuring results are set forth in Table 2 below.

EXAMPLE 11

Here, 100 parts of ethylene glycol diglycidyl ether is placed in a stainless container as the crosslinking agent (denaturant), and the upper opening of the container is covered with a 200-mesh stainless metal gauze. Then, 50 parts of the absorbent resin (a) is scattered uniformly over the metal gauze as the hydrophilic polymer.

Subsequently, the container is heated to evaporate ethylene glycol diglycidyl ether, so that a crosslinking treatment (denaturation) is carried out by bringing a gaseous ethylene glycol diglycidyl ether into contact with the absorbent resin (a) for 10 minutes.

When the treatment ends, the resulting crosslinked hydrophilic resin is collected as the absorbing agent. The absorbing agent thus obtained is in the form of particles, and is neither moist nor viscous, but dry and smooth. In addition, the production of agglomerate is not acknowledged herein. An amount of retained water and an absorbing amount under pressure of the resulting absorbing agent measured in the above-explained manners are 36 g/g and 11 g/g, respectively. The measuring results are set forth in Table 2 below.

Comparative Example 1

Here, 100 parts of the absorbent resin (a) is placed in an autoclave having a capacity of 1 l and equipped with a stirring blade as the hydrophilic polymer, and the reactant system is displaced by introducing a nitrogen gas, after which a pressure inside the reactant system is set to 7 Kgf/cm$^2$–8 Kgf/cm$^2$ with a nitrogen gas. Then, the inside of the reactant system is heated to 180° C. with stirring, and stirred further for 60 minutes while being kept at 180° C. In other words, the treatment is carried out without using ethylene oxide serving as the crosslinking agent.

When the treatment ends, the autoclave is opened and the resulting crosslinked hydrophilic resin is taken out as a comparative absorbing agent. An amount of retained water and an absorbing amount under pressure of the resulting comparative absorbing agent measured in the above-explained manners are 40 g/g and 8 g/g, respectively. Therefore, it is understood that the absorbency under pressure is not improved. The measuring results are set forth in Table 2 below.

Comparative Example 2

Here, 100 parts of the absorbent resin (a) is placed in an autoclave having a capacity of 1 l and equipped with a stirring blade as the hydrophilic polymer. Then, the inside of the reactant system is heated to 180° C. with stirring, and stirred further for 60 minutes while being kept at 180° C. In other words, the treatment is carried out without using ethylene oxide serving as the crosslinking agent and the reactant system is neither displaced with a nitrogen gas nor pressurized.

When the treatment ends, the autoclave is opened and the resulting crosslinked hydrophilic resin is taken out as a comparative absorbing agent. An amount of retained water and an absorbing amount under pressure of the resulting comparative absorbing agent measured in the above-explained manners are 42 g/g and 7 g/g, respectively. Therefore, it is understood that the absorbency under pressure is not improved. The measuring results are set forth in Table 2 below.

Comparative Example 3

Here, 10 parts of 3 wt % ethylene glycol aqueous solution serving as the crosslinking agent is sprayed intermittently to 100 parts of the absorbent resin (d) used as the hydrophilic polymer through a pressure type spray nozzle while the absorbent resin (d) is being moved by a fluidized-bed dryer to mix the two substances. However, these two substances are not mixed homogeneously, and a considerable amount of agglomerate is produced.

The resulting mixture is heated to 180° C. and subjected to heat treatment at 180° C. for 60 minutes. When the treatment ends, the resulting mixture is sieved through a 20-mesh metal gauze, and only the substance having passed through the metal gauze is collected as a treated hydrophilic polymer to be used as a comparative absorbing agent.

A considerable amount of agglomerate is produced in the comparative absorbing agent. An amount of retained water and an absorbing amount under pressure of the resulting comparative absorbing agent measured in the above-explained manners are 26 g/g and 6 g/g, respectively. Since the absorbent resin (d) and 3 wt % ethylene glycol aqueous solution are not mixed homogeneously, the absorbing amount under pressure is not improved. In other words, an absorbing amount under pressure is significantly lowered compared with the result in Example 6. The measuring results are set forth in Table 2 below.

TABLE

| | WATER RETAINING AMOUNT (g/g) | ABSORBING AMOUNT UNDER PRESSURE (g/g) |
|---|---|---|
| EXAMPLE 1 | 34 | 21 |
| EXAMPLE 2 | 28 | 21 |
| EXAMPLE 3 | 29 | 22 |
| EXAMPLE 4 | 30 | 18 |
| EXAMPLE 5 | 29 | 22 |
| EXAMPLE 6 | 23 | 11 |
| EXAMPLE 7 | 35 | 19 |
| EXAMPLE 8 | 33 | 22 |
| EXAMPLE 9 | 29 | 19 |
| EXAMPLE 10 | 30 | 22 |
| EXAMPLE 11 | 36 | 11 |
| ABSORBENT RESIN (a) | 43 | 7 |
| ABSORBENT RESIN (b) | 32 | 8 |
| ABSORBENT RESIN (c) | 33 | 8 |
| ABSORBENT RESIN (d) | 27 | 6 |
| COMPARATIVE EXAMPLE 1 | 40 | 8 |
| COMPARATIVE EXAMPLE 2 | 42 | 7 |
| COMPARATIVE EXAMPLE 3 | 26 | 6 |

The results of Examples 1–11 reveal that the absorbing amount under pressure is improved by applying the crosslinking treatment to the hydrophilic polymer. Also, the comparison with Comparative Examples 1–3 reveals that the denaturating method of the present invention can react the hydrophilic polymer with crosslinking agent (denaturant) efficiently. The comparison also reveals that an absorbing agent serving as the hydrophilic resin can be readily produced in a simple manner by the producing method of the present invention.

EXAMPLE 12

Herein, 3 parts of 50% polyethyleneimine aqueous solution having a weight average molecular weight of 70,000

(Epomine P-1050 of Nippon Shokubai Co., Ltd.) serving as the crosslinking agent (liquid denaturant substance) and 9 parts of aluminum oxide (average particle size: 80 μm) serving as the water-insoluble compound are mixed with each other with stirring. Consequently, a powdery denaturant substance (1) having an average particle size of 80 μm is obtained.

Then, 12 parts of the powdery denaturant substance (1) is added to 100 parts of the absorbent resin (e) serving as the hydrophilic polymer and mixed with each other. Then, the resulting mixture is heated and dried at 90° C. for 20 minutes. The resulting dry product is sieved through a metal gauze having 840 μm openings, and the substance having passed through the metal gauze is obtained as the hydrophilic resin to be used as the absorbing agent. The absorbency, absorbency under pressure, gel breaking strength, gel breaking strength after the gel breaking strength lowering promotion test, and retention of the resulting absorbing agent are measured in the above-described manners, and the results of which are set forth in Table 3 below.

EXAMPLE 13

Herein, perlite (particles of volcanic rocks, 80% of which is composed of $SiO_2$ and $Al_2O_3$) as the water-insoluble compound is sieved through a metal gauze having 500 μm openings, and the substance having passed through the metal gauze is collected. Then, 5 parts of the collected substance and 5 parts of 30% polyethyleneimine aqueous solution having a weight average molecular weight of 70,000 (Epomine P-1000 of Nippon Shokubai Co., Ltd.) are mixed with each other with stirring, and a powdery denaturant substance (2) having an average particle size of 200 μm is obtained.

Then, 10 parts of the powdery denaturant substance (2) is added to 100 parts of the absorbent resin (e) serving as the hydrophilic polymer and mixed with each other. The resulting product is sieved through a metal gauze having 840 μm openings, and the substance having passed through the metal gauze is obtained as the hydrophilic resin serving as the absorbing agent. The absorbency, absorbency under pressure, gel breaking strength, gel breaking strength after the gel breaking strength lowering promotion test, and retention of the resulting absorbing agent are measured in the above-described manners, and the results of which are set forth in Table 3 below.

EXAMPLE 14

To begin with, 5 parts of 30% polyethyleneimine aqueous solution having a weight average molecular weight of 70,000 (Epomine P-1000 of Nippon Shokubai Co., Ltd.) serving as the crosslinking agent (liquid denaturant substance) and 5 parts of powders of polyethylene (Floucene UF-1.5 of Sumitomo Seika Chemicals Co., Ltd. containing 99.9% or more of particles having a particle size of 75 μm or less) are mixed with each other with stirring, and a powdery denaturant (3) is obtained.

Then, 10 parts of the powdery denaturant (3) is added to 100 parts of the absorbent resin (e) serving as the hydrophilic polymer and mixed with each other. The resulting product is sieved through a metal gauze having 840 μm openings, and the substance having passed through the metal gauze is obtained as the hydrophilic resin serving an absorbing agent. The absorbency, absorbency under pressure, gel breaking strength, gel breaking strength after the gel breaking strength lowering promotion test, and retention of the resulting absorbing agent are measured in the above-described manners, and the results of which are set forth in Table 3 below.

Comparative Example 4

Herein, 5 parts of 30% polyethyleneimine aqueous solution having a weight average molecular weight of 70,000 (Epomine P-1000 of Nippon Shokubai Co., Ltd.) serving as the crosslinking agent (liquid denaturant substance) is added to 100 parts of the absorbent resin (e) serving as the hydrophilic polymer and mixed with each other. The resulting mixture is heated and dried at 90° C. for 20 minutes. The resulting dried product is sieved through a metal gauze having 840 μm openings, and the substance having passed through the metal gauze is collected as the treated hydrophilic polymer to be used as a comparative absorbing agent. The absorbency, absorbency under pressure, gel breaking strength, gel breaking strength after the gel breaking strength lowering promotion test, and retention of the comparative absorbing agent are measured in the above-described manners, and the results of which are set forth in Table 3 below.

TABLE 3

|  | EXAMPLE | | | COMPARATIVE |
|---|---|---|---|---|
|  | 12 | 13 | 14 | EXAMPLE 4 |
| ABSORBENCY (g/g) | 27 | 27 | 27 | 27 |
| ABSORBENCY UNDER PRESSURE (g/g) | 27 | 28 | 27 | 25 |
| GEL BREAKING STRENGTH (Kdyne/cm$^2$) | | | | |
| BEFORE GBSLPT | 195 | 216 | 206 | 210 |
| AFTER 24 HOURS FM GBSLPT | 164 | 185 | 145 | 117 |
| AFTER 48 HOURS FM GBSLPT | 132 | 168 | 115 | 80 |
| RETENTION (%) | 68 | 78 | 56 | 38 |

The results set forth in Table 3 reveal that the hydrophilic resin of the present invention can maintain high gel breaking strength and retention even after the lowering promotion test, because the hydrophilic resin contains the hydrophilic polymer having a functional group, and the powdery denaturant substance containing both the denaturant reactive with the above functional group and particles of the water-insoluble compound. This means that the hydrophilic resin of the present invention can maintain its bonding property over time after the production until being put into actual use. The reason is assumed to be as follows. Since the denaturant is contained in the powdery denaturant substance, the hydrophilic polymer and denaturant exist separately in the hydrophilic resin and never react with each other until being put into actual use. The hydrophilic polymer and denaturant start to react with each other, for example, when the absorbing resin has absorbed the aqueous liquid, and as a consequence, the hydrophilic polymer is denatured. Thus, not only the hydrophilic polymer can be denatured uniformly, but also the denaturing timing can be controlled, thereby making it possible to prevent the deterioration of the properties over time caused by denaturation. As has been explained, the hydrophilic resin of the present invention can prevent the deterioration of the properties over time more efficiently. Since the hydrophilic resin of the present invention is denatured after the powdery denaturant substance and hydrophilic polymer are mixed with each other homogeneously, the hydrophilic resin has an excellent absorbing property under pressure.

EXAMPLE 15

To begin with, 0.1 part of ethylene glycol diglycidyl ether serving as the crosslinking agent (denaturant), 2 parts of isopropyl alcohol serving as the hydrophilic organic solvent, and 1 part of hydrophilic microscopic particles of silicon dioxide (Aroesil 200 of Nippon Aroesil Co., Ltd.) serving as the water-insoluble compound are mixed with each other with stirring, and a powdery denaturant substance (4) having an average particle size of 10 $\mu$m is obtained.

Then, 3.1 parts of the powdery denaturant substance (4) is added to 100 parts of the absorbent resin (f) serving as the hydrophilic polymer and mixed each other, and after which 5 parts of water is added to the resulting mixture and mixed with each other. The resulting mixture is heated at 180° C. for 25 minutes and sieved through a metal gauze having 840 $\mu$m openings, and the substance having passed through the metal gauze is obtained as the crosslinked hydrophilic resin to be used as the absorbing agent. The absorbency and absorbency under pressure of the resulting absorbing agent are measured in the above-described manners, and the results of which are set forth in Table 4 below.

EXAMPLE 16

Herein, 1 part of glycerin serving as the crosslinking agent (denaturant), 1 part of isopropyl alcohol serving as the hydrophilic organic solvent, and 1 part of hydrophilic microscopic particles of silicon dioxide (Carplex 22S of Shionogi & Co., Ltd.) serving as the water-insoluble compound are mixed with each other with stirring, and a powdery denaturant substance (5) having an average particle size of 20 $\mu$m is obtained.

Then, 3 parts of the powdery denaturant substance (5) is added to 100 parts of the absorbent resin (f) serving as the hydrophilic polymer and mixed with each other, and after which 3 parts of water is added to the resulting mixture and mixed with each other. The resulting mixture is heated at 200° C. for 40 minutes and sieved through a metal gauze having 840 $\mu$m openings, and the substance having passed through the metal gauze is obtained as the crosslinked hydrophilic resin serving an absorbing agent. The absorbency and absorbency under pressure of the resulting absorbing agent are measured in the above-described manners, and the results of which are set forth in Table 4 below.

EXAMPLE 17

Herein, 0.1 part of ethylene glycol diglycidyl ether serving as the crosslinking agent (denaturant) and 7 parts of water are mixed with each other with stirring to obtain a liquid denaturant substance. The resulting liquid denaturant substance is cooled at −20° C. for 12 hours to turn the liquid denaturant substance into a solid. Then, the solid denaturant substance is pulverized and sieved through a metal gauze having 2 mm openings, and the substance having passed through the metal gauze is obtained as a powdery denaturant substance (6).

Then, 7.1 parts of the powdery denaturant substance (6) is added to 100 parts of the absorbent resin (f) serving as the hydrophilic polymer and mixed with each other. The resulting mixture is heated at 140° C. for 30 minutes and sieved through a metal gauze having 840 $\mu$m openings, and the substance having passed through the metal gauze is obtained as the crosslinked hydrophilic resin serving an absorbing agent. The absorbency and absorbency under pressure of the resulting absorbing agent are measured in the above-described manners, and the results of which are set forth in Table 4 below.

Comparative Example 5

The absorbent resin (f) is used as a comparative absorbing agent and the absorbency and absorbency under pressure of the same are measured in the above manners, the results of which are set forth in Table 4 below.

Comparative Example 6

Here, 0.1 part of ethylene glycol diglycidyl ether serving as the crosslinking agent (denaturant) and 2 parts of isopropyl alcohol serving as the hydrophilic organic solvent, and 5 parts of water are added to 100 parts of the absorbent resin (f) serving as the hydrophilic polymer and mixed with each other. The resulting mixture is heated at 180° C. for 25 minutes, and sieved through a metal gauze having 840 $\mu$m openings, and the substance having passed through the metal gauze is obtained as the crosslinked hydrophilic resin to be used as a comparative absorbing agent. The absorbency and absorbency under pressure of the comparative absorbing agent are measured in the above-described manners, and the results of which are set forth in Table 4 below.

Comparative Example 7

Here, 1 part of glycerin serving as the crosslinking agent (denaturant) and 1 part of isopropyl alcohol serving as the hydrophilic organic solvent, and 3 parts of water are added to 100 parts of the absorbent resin (f) serving as the hydrophilic polymer and mixed with each other. The resulting mixture is heated at 200° C. for 40 minutes, and sieved through a metal gauze having 840 $\mu$m openings, and the substance having passed through the metal gauze is obtained as the crosslinked hydrophilic resin to be used a comparative absorbing agent. The absorbency and absorbency under pressure of the comparative absorbing agent are measured in the above-described manners, and the results of which are set forth in Table 4 below.

Comparative Example 8

A comparative absorbing agent is obtained in the same manner as Example 17 except that the liquid denaturant substance is not made into powders. In other words, 0.1 part of ethylene glycol diglycidyl ether serving as the crosslinking agent (denaturant) and 7 parts of water are mixed with each other with stirring to obtain a liquid denaturant substance. Then, 7.1 parts of the liquid denaturant substance is added to 100 parts of the absorbent resin (f) serving as the hydrophilic polymer and mixed with each other. The resulting mixture is heated at 140° C. for 30 minutes, and sieved through a metal gauze having 840 $\mu$m openings, and the substance having passed through the metal gauze is obtained as the crosslinked hydrophilic resin to be used as a comparative absorbing agent. The absorbency and absorbency under pressure of the comparative absorbing agent are measured in the above-described manners, and the results of which are set forth in Table 4 below.

TABLE 4

| | EXAMPLE | | | COMPARATIVE EXAMPLE | | | |
|---|---|---|---|---|---|---|---|
| | 15 | 16 | 17 | 5 | 6 | 7 | 8 |
| ABSORBENCY (g/g) | 40 | 38 | 36 | 54 | 44 | 36 | 44 |
| ABSORBENCY UNDER PRESSURE (g/g) | 28 | 27 | 28 | 8 | 24 | 25 | 10 |

The results set forth in Table 4 reveal that the hydrophilic resin of the present invention has an excellent absorbing property under pressure because the hydrophilic resin is denatured (surface crosslinked) after the powdery denaturant substance and the hydrophilic polymer are mixed homogeneously.

Potential Industrial Application

According to the denaturing method of the present invention, the hydrophilic polymer is denatured with a gaseous denaturant. Therefore, the hydrophilic polymer can be denatured readily and uniformly in a simple manner compared with a case where the hydrophilic polymer and denaturant are reacted in a so-called solid-liquid system.

Further, according to the producing method of the hydrophilic resin of the present invention, since the hydrophilic polymer is reacted with a gaseous denaturant, the solvent or dispersing medium which is indispensable in the conventional methods can be omitted. Therefore, not only the hydrophilic polymer and denaturant can react with each other efficiently in a safe manner, but also an excessive denaturant can be readily removed and collected in a simple manner compared with the conventional methods. In addition, the collected denaturant can be readily recycled.

Also, according to another producing method of the hydrophilic resin of the present invention, the hydrophilic polymer and a powdery denaturant substance made from a liquid denaturant substance are mixed with each other. Therefore, the liquid denaturant substance which is substantially in the solid state can be mixed with the hydrophilic polymer. Consequently, the hydrophilic polymer and the liquid denaturant substance, in effect, the powdery denaturant substance, can be mixed with each other homogeneously compared with a case where the liquid denaturant substance and hydrophilic polymer are mixed with each other. In addition, since the hydrophilic polymer and liquid denaturant substance exist separately, the hydrophilic polymer does not start to absorb the liquid denaturant substance, or the reaction of the hydrophilic polymer and denaturant contained in the liquid denaturant substance does not take place as soon as the hydrophilic polymer and the powdery denaturant substance are mixed with each other. The hydrophilic polymer can be denatured uniformly, for example, when the hydrophilic resin has absorbed an aqueous liquid or the hydrophilic resin is heated, thereby making it possible to control the denaturation timing. Consequently, according to the producing method of the hydrophilic resin of the present invention, the hydrophilic resin having a good balance of properties can be readily produced.

In the hydrophilic resin obtained by the above producing method, the hydrophilic polymer is denatured when the hydrophilic polymer and denaturant are brought into contact and react with each other, for example, when the hydrophilic polymer has absorbed an aqueous liquid or the hydrophilic resin is heated. Therefore, not only the hydrophilic polymer can be denatured uniformly, but also the denaturation timing can be controlled. Thus, better properties, such as absorbency under pressure, can be obtained through the denaturation. In particular, in case that the liquid denaturant substance is a crosslinking agent containing a polyamine, the aforementioned bonding ability among the particles of the hydrophilic polymer and shape-keeping ability of the absorbent material are developed when the absorbent resin has absorbed the aqueous liquid. Further in this case, since it becomes possible to control the timing of interaction of the particles of the hydrophilic polymer triggered by polyamine or the like, deterioration caused by the change of the aforementioned properties, such as gel breaking strength, can be prevented more efficiently. The hydrophilic resin obtained by the above producing method has an excellent absorbing property under pressure, such as absorbency and water retaining ability under pressure, and for example, the hydrophilic resin can show excellent performance (absorbing property) even when used in sanitary goods or the like having a high percent by weight of the hydrophilic polymer (resin concentration). Further, the hydrophilic resin has an excellent absorbing property under pressure, and the hydrophilic polymer contained therein is hardly released from the absorbent material while water is being absorbed; moreover, the hydrophilic resin maintains its bonding property over time after the production until being put into actual use. For the reasons specified as above, the hydrophilic resin can be extensively and suitably used for sanitary goods, such as paper diapers, sanitary napkins, assisting material for incontinent patients, such as incontinence pads, wound protectors, and wound healing materials, to absorb body fluids; drip absorbing materials to absorb drip from foods or the like, or freshness preserving materials; water-retaining materials for soil to keep water in soil; water stopping materials; etc.

What is claimed is:

1. A producing method of a hydrophilic resin characterized in that a hydrophilic polymer is mixed with a powdery denaturant substance made from a liquid denaturant substance.

2. The producing method of claim 1, wherein said liquid denaturant substance is made into powders by being mixed with powders of a water-insoluble compound.

3. The producing method of claim 1, wherein said liquid denaturant substance is made into powders by being cooled to or below a melting point of said liquid denaturant substance and turned into a solid state.

4. The producing method of claim 1, wherein a mixture of said hydrophilic polymer and said powdery denaturant substance is heated.

5. The producing method of claim 1, wherein an aqueous liquid in a liquid or gaseous state is added to a mixture of said hydrophilic polymer and said powdery denaturant substance first, and thence a resulting mixture is heated.

6. The producing method of claim 1, wherein said hydrophilic polymer is an absorbent resin having an acidic group.

7. The producing method of claim 1, wherein said liquid denaturant substance contains a crosslinking agent.

8. The producing method of claim 7, wherein said crosslinking agent contains a polyamine whose weight average molecular weight is 2,000 or greater.

* * * * *